(12) United States Patent
Wall, II et al.

(10) Patent No.: US 12,441,609 B2
(45) Date of Patent: Oct. 14, 2025

(54) SYSTEMS AND METHODS FOR SUPPLEMENTING RADIATOR COOLING WITH AN AMMONIA HEAT-EXCHANGE UNIT AND ADJUSTABLE AIR INTAKE LOUVERS

(71) Applicant: First Ammonia Motors, Inc., Concord, NC (US)

(72) Inventors: James L. Wall, II, Concord, NC (US); David Gwynn Kapp, Jr., Concord, NC (US)

(73) Assignee: First Ammonia Motors, Inc., Concord, NC (US)

( * ) Notice: Subject to any disclaimer, the term of this patent is extended or adjusted under 35 U.S.C. 154(b) by 0 days.

(21) Appl. No.: 19/222,111

(22) Filed: May 29, 2025

(65) Prior Publication Data

US 2025/0289714 A1    Sep. 18, 2025

Related U.S. Application Data

(63) Continuation of application No. 18/904,051, filed on Oct. 1, 2024, now Pat. No. 12,358,787, which is a
(Continued)

(51) Int. Cl.
*F02M 21/02*       (2006.01)
*C01B 3/04*        (2006.01)

(52) U.S. Cl.
CPC ......... *C01B 3/047* (2013.01); *F02M 21/0206* (2013.01); *F02M 21/0227* (2013.01);
(Continued)

(58) Field of Classification Search
CPC ............. F02M 21/0215; F02M 21/023; F02M 21/0239; F02M 21/0242; F02M 21/0245;
(Continued)

(56) References Cited

U.S. PATENT DOCUMENTS

| | | | |
|---|---|---|---|
| 2,140,254 A * | 12/1938 | Zavka | F01K 25/06 123/3 |
| 4,480,595 A | 11/1984 | Hobby et al. | |

(Continued)

FOREIGN PATENT DOCUMENTS

| | | | | |
|---|---|---|---|---|
| CA | 2654823 A1 * | 8/2009 | | F02B 43/10 |
| CN | 103388541 A * | 11/2013 | | F02M 21/06 |

(Continued)

OTHER PUBLICATIONS

Comotti et al., "Hydrogen generation system for ammoniae hydrogen fuelled internal combustion engines", International Journal of Hydrogen Energy 40(33):10673-10686, Sep. 2015.
(Continued)

*Primary Examiner* — Hung Q Nguyen

(57) ABSTRACT

The present invention relates, in general, to systems and methods for generating hydrogen from ammonia on-board vehicles, where the produced hydrogen is used as fuel source for an internal combustion engine along with ammonia. The present invention utilizes ammonia not only as a co-fuel for the engine, but also as a heat-exchange medium used by a cooling system that supplements radiator cooling along with air intake louvers that are adjusted based on the temperature of the internal combustion engine.

20 Claims, 30 Drawing Sheets

Related U.S. Application Data continuation-in-part of application No. 18/660,466, filed on May 10, 2024, now Pat. No. 12,162,754, which is a continuation-in-part of application No. 18/241,328, filed on Sep. 1, 2023, now Pat. No. 11,981,562, which is a continuation of application No. 17/986,265, filed on Nov. 14, 2022, now Pat. No. 11,840,449.

(60) Provisional application No. 63/395,820, filed on Aug. 6, 2022.

(52) U.S. Cl.
CPC ............... *C01B 2203/0277* (2013.01); *C01B 2203/085* (2013.01); *C01B 2203/1035* (2013.01); *C01B 2203/1205* (2013.01); *C01B 2203/1623* (2013.01); *C01B 2203/84* (2013.01)

(58) Field of Classification Search
CPC ............... F02M 21/06; F02M 21/0206; F02M 21/0227; C01B 3/047; C01B 2203/1623; C01B 2203/84
See application file for complete search history.

(56) References Cited

U.S. PATENT DOCUMENTS

| | | | |
|---|---|---|---|
| 5,976,723 A | 11/1999 | Boffito et al. | |
| 6,588,211 B2 | 7/2003 | Friebe et al. | |
| 6,936,363 B2 | 8/2005 | Kordesch et al. | |
| 7,451,747 B2 * | 11/2008 | Hayashi | F02M 21/0236 123/557 |
| 7,867,300 B2 | 1/2011 | Chellappa et al. | |
| 8,025,033 B2 | 9/2011 | Schiltz et al. | |
| 8,151,779 B1 | 4/2012 | Hagiwara et al. | |
| 8,166,926 B2 | 5/2012 | Sasaki et al. | |
| 8,272,353 B2 | 9/2012 | Dincer et al. | |
| 8,561,578 B2 | 10/2013 | Miyagawa et al. | |
| 8,904,765 B2 | 12/2014 | Miyagawa et al. | |
| 8,961,923 B2 | 2/2015 | Grannell et al. | |
| 9,249,720 B2 | 2/2016 | Miyagawa et al. | |
| 9,506,400 B2 | 11/2016 | Tange et al. | |
| 10,961,890 B2 | 3/2021 | Sung et al. | |
| 11,286,831 B2 | 3/2022 | Al-Rub et al. | |
| 11,421,629 B2 | 8/2022 | Takeuchi | |
| 11,578,686 B2 | 2/2023 | Takeuchi et al. | |
| 11,713,727 B2 | 8/2023 | Homma et al. | |
| 2002/0028171 A1 | 3/2002 | Goetsch et al. | |
| 2007/0283927 A1 * | 12/2007 | Fukumoto | F02M 61/1853 123/445 |
| 2010/0288249 A1 * | 11/2010 | Sasaki | F02B 43/00 123/575 |
| 2011/0293510 A1 | 12/2011 | Grannell et al. | |
| 2014/0238316 A1 | 8/2014 | Tange et al. | |
| 2014/0356738 A1 | 12/2014 | Bell et al. | |
| 2018/0230006 A1 | 8/2018 | Finkelshtain et al. | |
| 2023/0053230 A1 | 2/2023 | Jo et al. | |

FOREIGN PATENT DOCUMENTS

| | | | |
|---|---|---|---|
| CN | 116428081 A | 7/2023 | |
| JP | 2020147475 A | 9/2020 | |
| JP | 2020172904 A | 10/2020 | |
| JP | 2021173232 A | 11/2021 | |
| JP | 2023006061 A | 1/2023 | |
| JP | 2023096372 A | 7/2023 | |
| WO | 2002086987 A2 | 4/2003 | |
| WO | WO-2010058807 A1 * | 5/2010 | ............ B01J 23/46 |
| WO | WO-2011136130 A1 * | 11/2011 | ............ F02D 19/022 |
| WO | WO-2013119281 A1 * | 8/2013 | ............ B01J 19/2415 |

OTHER PUBLICATIONS

Ammonigy GMBH, "Part 1: With ammonia to CO2-free and cost-effective heavy-duty transport", 2022.
De Vries, "Safe and effective application of ammonia as a marine fuel", Delft University of Technology, 2019.
Abd Ali et al., "Ammonia as Hydrogen Storage Media, Sustainable Method to Hydrogen Evolution", 2018 J. Phys.: Conf. Ser. 1032.

* cited by examiner

SYSTEMS AND METHODS FOR SUPPLEMENTING RADIATOR COOLING WITH AN AMMONIA HEAT-EXCHANGE UNIT AND ADJUSTABLE AIR INTAKE LOUVERS

CROSS REFERENCE TO RELATED APPLICATIONS

This application is a continuation of, and claims the benefit of, U.S. patent application Ser. No. 18/904,051 entitled "SYSTEMS AND METHODS FOR AN INTERNAL COMBUSTION ENGINE UTILIZING AMMONIA AS A FUEL SOURCE AND AS A HEAT-EXCHANGE MEDIUM FOR ENGINE COOLING" filed on Oct. 1, 2024, which is a continuation-in-part of, and claims the benefit of, U.S. Pat. No. 12,162,754 entitled "SYSTEMS AND METHODS FOR ENGINE-MOUNTED CATALYTIC PRODUCTION OF HYDROGEN FROM AMMONIA FOR USE AS A COMBUSTION FUEL" filed on May 10, 2024, which is a continuation-in-part of, and claims the benefit of, U.S. Pat. No. 11,981,562 entitled "SYSTEMS AND METHODS FOR THE ON-BOARD CATALYTIC PRODUCTION OF HYDROGEN FROM AMMONIA USING A HEAT EXCHANGE CATALYST UNIT AND AN ELECTRIC CATALYST UNIT OPERATING IN SERIES" filed on Sep. 1, 2023, which is a continuation of, and claims the benefit of, U.S. Pat. No. 11,840,449 filed on Nov. 14, 2022, which claims the benefit of U.S. Provisional Patent Application No. 63/395,820 entitled "SYSTEMS AND METHODS FOR THE CATALYTIC PRODUCTION OF HYDROGEN FROM AMMONIA ON-BOARD MOTOR VEHICLES" filed on Aug. 6, 2022, U.S. Provisional Patent Application No. 63/355,959 entitled "SYSTEMS AND METHODS FOR THE CATALYTIC PRODUCTION OF HYDROGEN FROM AMMONIA ON-BOARD MOTOR VEHICLES" filed on Jun. 27, 2022, and U.S. Provisional Patent Application No. 63/312,121 entitled "SYSTEMS AND METHODS FOR THE CATALYTIC PRODUCTION OF HYDROGEN FROM AMMONIA ON-BOARD MOTOR VEHICLES" filed on Feb. 21, 2022, all of which are commonly owned, the disclosure of each is incorporated herein by reference in their entireties.

BACKGROUND

Field of the Invention

The present invention relates, in general, to systems and methods for generating hydrogen from ammonia on-board vehicles, where the produced hydrogen is used as fuel source for an internal combustion engine, and where ammonia is used as a heat-exchange medium for a cooling system of the internal combustion engine.

Description of Related Art

The increase in the overall temperature on and above Earth's surface represents a critical challenge facing the planet. Earth's climate is significantly changing mainly due to human activities, and the transportation sector plays a prominent role in this global warming. For example, internal combustion engines have traditionally burned fossil fuels, which in turn produces $CO_2$ a known contributor to global warming. Over the last decade, the transportation sector has made strides in making electric- and hybrid-powered vehicles available on a mass scale. Most electric and hybrid vehicles sold today tend to produce significantly fewer global warming emissions than most vehicles operating on fossil fuels, namely gasoline. However, the environmental benefits of electric and hybrid vehicles still depend primarily on how much fossil fuel is being burned to charge these vehicles. For example, if the vehicles are charged using a coal-heavy power grid, the environmental benefits are lessened.

Furthermore, the batteries and fuel cells in electrified vehicles rely on raw materials such as cobalt, lithium and rare earth elements. These materials have been linked to grave environmental and human rights concerns. For instance, cobalt has been especially problematic. Mining cobalt produces hazardous tailings and slags that can leach into the environment, and studies have found high exposure rates of cobalt and other metals in communities surrounding cobalt mining and processing facilities. Extracting such metals from their ores also requires a process called smelting, which can emit sulfur oxide and other harmful air pollution.

Given the sustained environmental issues that currently exist with electrified vehicles, ammonia has been suggested as an alternative to fossil fuels for use in internal combustion engines, given its relatively high energy density and zero $CO_2$ emissions when combusted. However, pure ammonia cannot efficiently be used as a fuel in small internal combustion engines, whether spark-ignited (i.e., gasoline), or compression ignited (i.e., diesel), because pure ammonia burns too slowly to complete combustion during the power stroke in a four-stroke engine operating at speeds of thousands of revolutions per minute (RPM). In other words, when ammonia is combusted, the combustion produces a flame with a relatively low propagation speed. This low combustion rate of ammonia causes combustion to be inconsistent under low engine load and high engine speed operating conditions.

Prior approaches to fueling combustion engines with ammonia or hydrogen alone have required mixing the ammonia or hydrogen with a secondary combustion promoter fuel, such as gasoline, liquefied petroleum, or diesel. However, the requirement for a secondary combustion promoter fuel fluctuates with varying engine loads and engine speed, which can cause control issues. Thus, using a secondary combustion promotor fuel typically requires an additional control mechanism that must be part of the engine management system.

In addition, the use of a fossil fuel, even as a secondary combustion promotor fuel as described in U.S. Pat. No. 4,480,595 to Hobby et al., does not achieve zero carbon emissions, and the use of fossil fuels as a fuel source in any capacity adds to the greenhouse effect and contributes to global warming.

Hydrogen has also been suggested as an alternative to fossil fuels for use in internal combustion engines, as it is extremely plentiful, and can match the power of gasoline or diesel given its lower heating value. Hydrogen has a high flame velocity and a low ignition temperature, making it easy to ignite, and it is known to burn approximately six times faster than gasoline. Most importantly, hydrogen produces zero $CO_2$ emissions when combusted.

However, a challenge with using hydrogen on-board a vehicle is that it is an extremely light, low-density gas, and it cannot be stored as easily as liquid fossil fuels. Hydrogen requires compression, cooling, or a combination of both. The use of compressed hydrogen fuel tanks on-board vehicles inherently leads to several safety issues, such as the risk of potential failure of the pressure vessel, leakage of hydrogen in a confined space, and the like.

It is known that hydrogen can be obtained from ammonia by catalytic decomposition into its constituent hydrogen and nitrogen components through a process referred to as "cracking". However, the ammonia cracking process is an endothermic process which requires heat. With a limited electrical supply on-board a motor vehicle, it is difficult to generate the heat required to efficiently perform the ammonia crack on-board.

Conventional catalyst units for vehicles, also referred to as catalytic converters, are well known. These catalyst units typically have a planar metallic conductor through which an electric current is passed. For example, Emitec Technologies GmbH™ of Lohmar, Germany manufactures an electric catalytic converter that is used to treat exhaust gas emissions and includes a spiral planar conductor. Such planar conductors are used for exothermic reactions.

The conductor can also be in other forms, such as a honeycomb structure of the ammonia reforming device as described in U.S. Pat. No. 11,421,629 to Takeuchi, which utilizes an exothermic reaction to generate hydrogen gas from ammonia gas.

The ammonia dissociation reaction is highly endothermic, however. With conventional catalytic converters, there is usually limited surface area, given the inherent low length-to-diameter ratio, that would allow for an endothermic reaction to absorb sufficient heat into the ammonia gas in order to provide for efficient ammonia dissociation.

Furthermore, conventional catalytic converters are not designed to contain a significant amount of pressure, as they are used primarily to contain exhaust gas. Consequently, there is not a large pressure differential across the ends of these catalyst converter devices that needs to be scaled. In addition, conventional catalytic converters are typically made from steel, such as, for example, elastomeric steel, which can be prone to leakage and cannot be hermetically sealed. For the purposes of on-board ammonia dissociation, an unsealed device is not suitable, given the risk of pungent, heated ammonia and/or flammable hydrogen being exposed to the environment, the vehicle components, and the vehicle occupants.

Other systems utilizing exothermic reactions for the on-board production of hydrogen from ammonia burn ammonia to generate heat required for the exothermic reaction. For example, US Patent Pub. No. 20140105816 to Grannell and US Patent Pub. No. 20140238316 to Tange each describe ammonia cracking systems which rely on burning ammonia, such as with a flame cracker, to generate heat required for ammonia decomposition.

In addition, various attempts have been made to optimize the cooling of engine components. For example, conventional engine cooling systems are designed to control ambient cooling airflow throughout the engine compartment such that a desired amount of heat is transferred away from the engine, transmission, and other components which generate heat. Engine cooling systems thus maintain an optimal operating temperature for engines.

Such systems typically rely on a radiator mounted behind a grille positioned at a front portion of the vehicle. Generally, grilles and openings at the front portion of vehicles tend to negatively impact the vehicle's aerodynamic signature, leading to reduced fuel efficiency. Accordingly, it is beneficial to minimize the number, profile, and size of such grilles and radiators. However, reducing the size of these components can lead to less efficient engine cooling.

Therefore, there is a need for systems and methods to generate hydrogen from ammonia on-board vehicles for use as an internal combustion engine fuel source which does not require a fossil fuel as a promotor, co-fuel, additive, or auxiliary fuel, and which addresses the aforementioned challenges and drawbacks of vehicle cooling systems that rely primarily on ambient cooling airflow.

SUMMARY

In an embodiment, the present invention is directed to a system for heat-exchange between ammonia and engine coolant for an internal combustion engine, comprising: an electronic control unit (ECU); an ammonia tank containing ammonia; a heat-exchange unit fluidly coupled to the ammonia tank and to the internal combustion engine, the heat-exchange unit receiving ammonia from the ammonia tank; a radiator fluidly coupled to the heat-exchange unit and to the internal combustion engine, the radiator receiving hot engine coolant from the internal combustion engine, and the radiator supplying the hot engine coolant to the heat-exchange unit; a temperature sensor coupled to the ECU to detect a temperature of the internal combustion engine; and at least one louver coupled to the ECU, the louver configured to be in an open state and a closed state, wherein the ECU adjusts the louver to the open state when a difference between the temperature of the internal combustion engine and an optimal operating temperature is above a threshold value, thereby maximizing ambient airflow to the radiator to facilitate cooling of the hot engine coolant, wherein the ECU adjusts the louver to the closed state when the temperature of the internal combustion engine is below the optimal operating temperature, thereby blocking ambient airflow to the radiator, wherein heat is transferred from the hot engine coolant to the ammonia within the heat-exchange unit, resulting in heated ammonia and cooled engine coolant, wherein the heated ammonia exits the heat-exchange unit and is supplied to the internal combustion engine, and wherein the cooled engine coolant exits the heat-exchange unit and is supplied to the radiator.

In another embodiment, the present invention is directed to a system for heat-exchange between ammonia and engine coolant for an internal combustion engine, comprising: an electronic control unit (ECU); an ammonia tank containing ammonia; a heat-exchange unit fluidly coupled to the ammonia tank and to the internal combustion engine, the heat-exchange unit receiving ammonia from the ammonia tank; a radiator fluidly coupled to the heat-exchange unit and to the internal combustion engine, the radiator receiving hot engine coolant from the internal combustion engine, and the radiator supplying the hot engine coolant to the heat-exchange unit; a temperature sensor coupled to the ECU to detect a temperature of the internal combustion engine; and at least one louver coupled to the ECU, the louver configured to be in an open state and a partially open state, wherein the ECU adjusts the louver to the open state when a difference between the temperature of the internal combustion engine and an optimal operating temperature is above a threshold value, thereby maximizing ambient airflow to the radiator to facilitate cooling of the hot engine coolant, wherein the ECU adjusts the louver to the partially open state when the difference between the temperature of the internal combustion engine and the optimal operating temperature is below the threshold value, thereby reducing ambient airflow to the radiator, wherein heat is transferred from the hot engine coolant to the ammonia within the heat-exchange unit, resulting in heated ammonia and cooled engine coolant, wherein the heated ammonia exits the heat-exchange unit and is supplied to the internal combustion engine, and wherein the cooled engine coolant exits the heat-exchange unit and is supplied to the radiator.

In yet another embodiment, the present invention is directed to a system for heat-exchange between ammonia and engine coolant for an internal combustion engine, comprising: an electronic control unit (ECU); an ammonia tank containing ammonia; a heat-exchange unit fluidly coupled to the ammonia tank and to the internal combustion engine, the heat-exchange unit receiving ammonia from the ammonia tank; a radiator fluidly coupled to the heat-exchange unit and to the internal combustion engine, the radiator receiving hot engine coolant from the internal combustion engine, and the radiator supplying the hot engine coolant to the heat-exchange unit; a temperature sensor coupled to the ECU to detect a temperature of the internal combustion engine; and at least one louver coupled to the ECU, the louver configured to be in an open state, a closed state, and a partially open state, wherein the ECU adjusts the louver to the open state when a difference between the temperature of the internal combustion engine and an optimal operating temperature is above a threshold value, thereby maximizing ambient airflow to the radiator to facilitate cooling of the hot engine coolant, wherein the ECU adjusts the louver to the closed state when the temperature of the internal combustion engine is below the optimal operating temperature, thereby blocking ambient airflow to the radiator, wherein the ECU adjusts the louver to the partially open state when the difference between the temperature of the internal combustion engine and the optimal operating temperature is below the threshold value, thereby reducing ambient airflow to the radiator, wherein heat is transferred from the hot engine coolant to the ammonia within the heat-exchange unit, resulting in heated ammonia and cooled engine coolant, wherein the heated ammonia exits the heat-exchange unit and is supplied to the internal combustion engine, and wherein the cooled engine coolant exits the heat-exchange unit and is supplied to the radiator.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
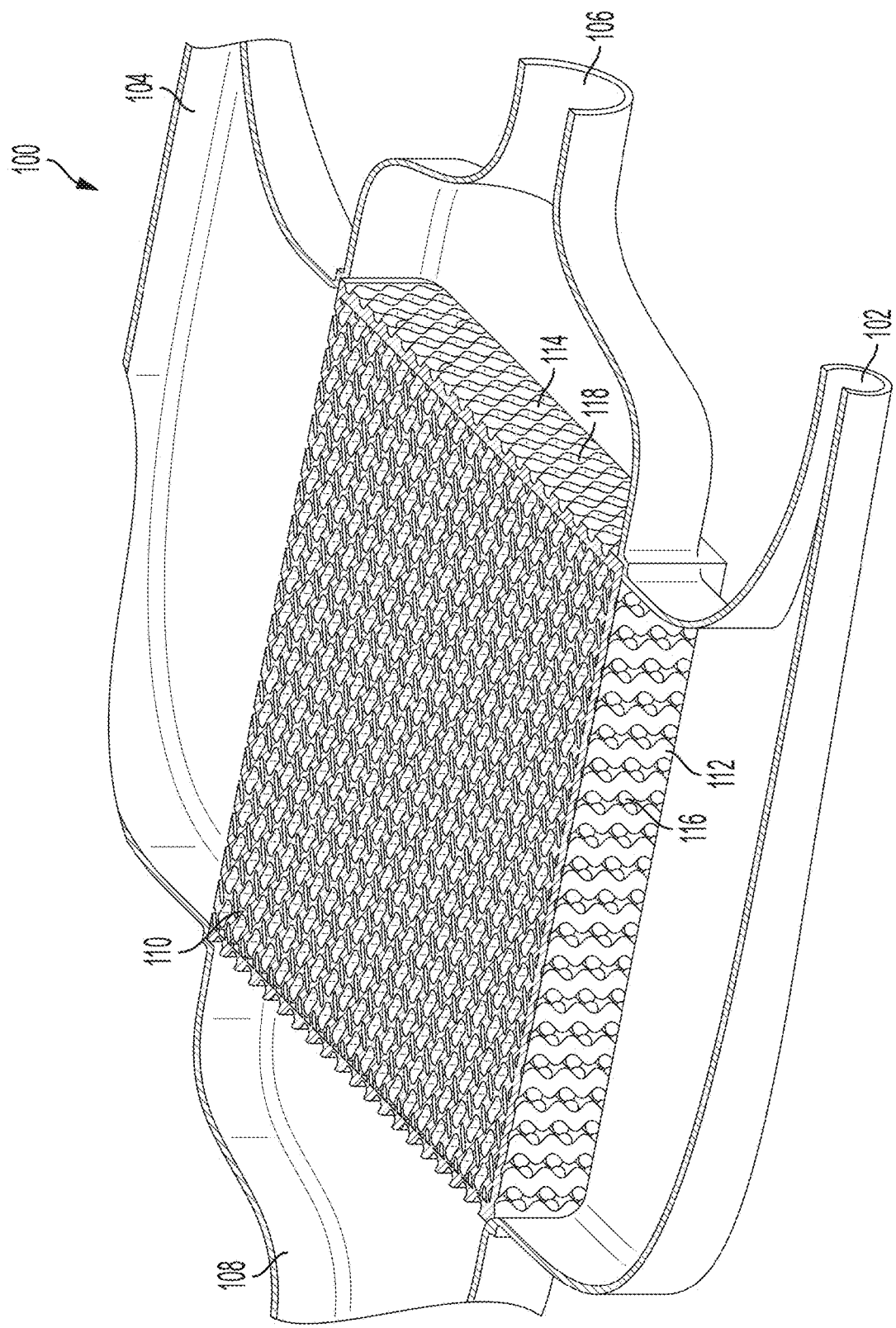
FIG. 1 is a perspective internal view of an exchange catalyst unit that utilizes a TPMS structure.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "motor vehicle" refers to any moving vehicle that is capable of carrying one or more human occupants and/or cargo, or which is capable of performing a task, and which is powered by any form of energy. The term "motor vehicle" includes, but is not limited to: (a) vehicles such as cars, trucks, vans, minivans, sport utility vehicles, passenger carrying vehicles, goods carrying vehicles, 2-, 3-, and 4-wheeled vehicles, quadricycles, motorcycles, scooters, all-terrain vehicles, utility task vehicles, and the like; (b) airborne vehicles such as helicopters, airplanes, airships, drones, aerospace vehicles, and the like; (c) marine vessels such as dry cargo ships, liquid cargo ships, specialized cargo ships, tug-boats, cruise ships, recreational boats, fishing boats, personal watercraft, jet skis, and the like; (d) locomotives; and (e) heavy equipment and machinery, power generators, lawnmowers and tractors, agricultural equipment and machinery, forestry equipment and machinery, construction equipment and machinery, mining equipment and machinery, and the like.

As used herein, the term "internal combustion engine" refers to any engine, spark ignition gasoline engine, compression ignition diesel engine, rotary, reciprocating, or other engine wherein combustion takes place in a combustion chamber, such that the products of combustion, together with any other by-products, perform work by exerting force on a moving surface from which the mechanical output is obtained from the engine. The term "internal combustion engine" includes, but is not limited to, hybrid internal combustion engines, two-stroke engines, four-stroke engines, six-stroke engines, and the like.

As used herein, the term "catalyst" refers to a material that promotes a chemical reaction. The term "catalyst" includes, but is not limited to, a catalyst or catalysts capable of promoting cracking reactions, such as ammonia cracking reactions, whether used as base catalyst(s) and/or additive catalyst(s). The catalyst, for the purposes of the present invention, can include, but is not limited to, a non-stoichiometric lithium imide, nickel, iron, cobalt, iron cobalt, ruthenium, vanadium, palladium, rhodium, platinum, sodium amide, and the like, as well as various combinations thereof.

As used herein, the terms "dissociation" and "cracking" refer to a process or processes by which ammonia is dissociated and/or decomposed into constituent hydrogen and nitrogen components over at least one catalyst.

As used herein, the term "nickel alloy" refers to pure nickel or an alloy containing nickel as a main component. The term "nickel alloy" includes, but is not limited to, Inconel®, such as, for example, Inconel® 625, Inconel® 718, Inconel® 725, and other compound metals having nickel as a main component. Inconel® is the trademark of Special Metals Corporation of Huntington, West Virginia, and is a nickel-chromium-based superalloy often utilized in extreme environments where components are subjected to high temperature, pressure, or mechanical loads.

As used herein the term "triply-periodic minimal surface (TPMS)" refers to mathematically defined structures that repeat in three dimensions with zero mean curvatures and large surface areas.

As used herein, the term "ceramic" refers to silicon nitride ceramic, ceramic glass, steatite ceramic, fused quartz, glass, and other non-conductive ceramic materials.

As used herein, the term "lattice" refers to a structure where unit cells are repeated at one or more respective points of a periodic array, resulting in a structure that appears the same from any point.

As used herein, the term "three-dimensional printing" and "three-dimensionally printed" refer to a three-dimensional object obtained via an additive manufacturing process, where the object has a height, a width, and a length. Additive manufacturing processes are those in which material is deposited, joined, or solidified under computer control, with the material being added together, typically layer by layer.

As used herein, the term "fossil fuel" refers to any carbon compound- or hydrocarbon-containing material, and includes coal, petroleum, oil, and natural gas, as well as fuels derived from physical separations, transformations, and/or reformulations of these materials, including, but not limited to, motor gasoline, diesel fuel, gasohol, kerosene, propane, and any of the foregoing materials in combination.

As used herein, the term "coolant" refers to a fluid that is transported through and/or around components to control the temperature of these components. The coolant may in some cases remove heat from the components to cool the components, or in other cases, the coolant may transfer heat contained therein to the components to heat the components. The coolant may be an inorganic additive technology (IAT) coolant (such as ethylene glycol in the form of a conventional low-silicate coolant (i.e., antifreeze), a fully-formulated coolant, or an extended life coolant), an organic acid technology (OAT) coolant, and/or a hybrid organic acid technology (HOAT) coolant. Further, the coolant may be any medium which is capable of transferring heat, such as water, refrigerants, betaine, polyalkylene glycol, propylene glycol, oil, liquified gases, nanofluids, and the like.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an internal combustion engine for a motor vehicle, it is understood that the system could be implemented in any engine-driven setting that may be powered by ammonia and/or hydrogen fuel.

FIG. 1 is a perspective internal view of a heat-exchange catalyst unit that utilizes a TPMS structure, and which serves as a heat-exchanger as well as a catalytic converter that performs ammonia cracking, according to an embodiment of the present invention. The heat-exchange catalyst unit 100 is metallic, and in an embodiment, includes a gaseous ammonia inlet 102, a hydrogen outlet 104, a heated exhaust gas inlet 106, and an exhaust gas outlet 108. In an embodiment, the heat-exchange catalyst unit 100 is made from a nickel alloy. In a preferred embodiment, the heat-exchange catalyst unit 100 is made from Inconel® 625.

In an embodiment, the gaseous ammonia inlet 102, the hydrogen outlet 104, the heated exhaust gas inlet 106, and the exhaust gas outlet 108 can be made from the same metallic material as the heat-exchange catalyst unit 100. In another embodiment, the gaseous ammonia inlet 102, the hydrogen outlet 104, the heated exhaust gas inlet 106, and the exhaust gas outlet 108 can be made from stainless steel, silver, bronze, and comparable alloys.

Positioned between the inlets 102, 106 and outlets 104, 108 is a matrix 110. The matrix 110 is formed from widthwise surfaces 112 and lengthwise surfaces 114 which run generally perpendicular to each other. The surfaces 112, 114 of the matrix 110 create passages that allow the gaseous ammonia and heated exhaust gas to flow; these passages are indicated by the ammonia channels 116 and heated exhaust gas channels 118. Gaseous ammonia is supplied to heat-exchange catalyst unit 100 via inlet 102, while heated exhaust gas is concurrently supplied to inlet 106. The gaseous ammonia traverses the matrix 110 via ammonia channels 116, while the heated exhaust gas traverses the matrix via heated exhaust gas channels 118. The ammonia channels 116 and the heated exhaust gas channels 118 are orientated in a generally perpendicular fashion to one another, such that the gaseous ammonia traverses the matrix 110 at approximate right angles relative to the heated exhaust gas.

In an embodiment, the surfaces 112, 114 have a thickness of 1 to 2 millimeters, and each of the surfaces 112, 114 can have the same thickness. In another embodiment, the surfaces 112, 114 can each have a different thickness. In yet another embodiment, the surfaces 112, 114 may vary in thickness as they each traverse across the matrix 110. For example, the surfaces 112, 114 may not have a uniform thickness across the width of the matrix 110 and may have thicker or narrower portions at various locations.

As shown in FIG. 1, the matrix 110 physically separates the gases passing through each of the channels 116, 118, thereby providing an exceptionally large surface area throughout the matrix 110 where the heated exhaust gas exchanges its heat with the gaseous ammonia. In an embodiment, the surfaces 112, 114 of the matrix 110 are coated with a catalyst that facilitates the cracking of ammonia into constituent hydrogen and nitrogen components (hereinafter, collectively, a "hydrogen gas mixture"). In this embodiment, the surfaces 112, 114 of the matrix 110 are coated with the catalyst using a washcoating or deposition technique to bind or adhere the catalyst to the surfaces 112, 114.

In another embodiment, catalyst in the form of discrete catalyst media is deposited into the passages forming the ammonia channels 116 and heated exhaust gas channels 118. The discrete catalyst media can be porous, allowing the gaseous ammonia and exhaust gas to pass through the catalyst as they each flow through the matrix 110.

In yet another embodiment, the surfaces 112, 114 of the matrix 110 can be coated with a catalyst as described herein, and additional discrete catalyst media can be deposited into the passages forming the ammonia channels 116 and heated exhaust gas channels 118.

In an embodiment, the matrix 110 is metallic, and is made from a nickel alloy. In a preferred embodiment, the matrix 110 is made from Inconel® 625. The heat-exchange catalyst unit 100 and matrix 110 may be constructed from the same metallic material. In another embodiment, the heat-exchange catalyst unit 100 and matrix 110 can be constructed from different metallic materials.

The material(s) selected for the heat-exchange catalyst unit 100 and matrix 110 need to have the ability to withstand the corrosive environment resulting from the high-temperature heated exhaust gas, as well as the heated hydrogen gas which is generated from the cracking of ammonia.

In a preferred embodiment, the matrix 110 is in the form of a triply-periodic minimal surface (TPMS), and the matrix 110 is three-dimensionally (3D) printed using powdered metal. The 3D printing process is an additive manufacturing process that uses laser sintering to selectively fuse together particles of the powdered metal into a TPMS structure in a layer-by-layer strategy. The TPMS structure of the matrix 110 provides for a relatively large surface area comprising cells which can be confined within the dimensions and shape of the heat-exchange catalyst unit 100.

The TPMS structure can take on a variety of crystalline-like structures which have different patterns and profiles. In the embodiment shown in FIG. 1, the TPMS is a gyroid structure. The structures can be in the form of, but are not limited to, gyroid, diamond, orthogonal holes, split pea, among many others. Each of these forms has a different surface area. For example, in the embodiment shown in FIG. 1, the heat-exchange catalyst unit 100 has dimensions of approximately 10×10×4 inches. For a matrix 110 which fits within these dimensions, Table 1 provides approximate surface area values for the various TPMS structure that may be utilized:

TABLE 1

| Structure | Surface Area (million millimeters$^2$) |
| --- | --- |
| Gyroid | 1.5 million mm$^2$ |
| Orthogonal holes | 1.6 million mm$^2$ |
| Split pea | 2.1 million mm$^2$ |
| Diamond | 2.5 million mm$^2$ |

It is noted however, that the values in Table 1 are illustrative examples only and are not intended to be in any way limiting. The individual cell sizes of the TPMS can be modified to increase or decrease the surface area of the matrix 110. For example, within the same volume of the heat-exchange catalyst unit 100, the individual cell size can be increased to increase the overall surface area of the matrix 110, and conversely, the individual cell size can be decreased to decrease the overall surface area of the matrix 110.

The TPMS structure is ideal for the matrix 110 as it allows heat to be distributed to all surfaces of the matrix 100, thereby facilitating the chemical reaction required for the ammonia cracking process. As the surface area of the matrix 110 increases, there is an inherent challenge in cleaning the surfaces of the matrix 110 after it is printed, given that the formation of the channels 116, 118 become narrower relative to one another as the surface area increases. However, as the cell size of the matrix 110 increases, the surface area decreases, which decreases the throughput efficiency of the heat-exchange catalyst unit 100. The surface area of the matrix 110 can depend on the power requirements of the motor vehicle and its engine.

In an embodiment, the heat-exchange catalyst unit 100 is sized and dimensioned to accommodate a matrix 110 with sufficient surface area to facilitate the cracking process, while still having a form factor that is suitable for placement within a motor vehicle. The dimensions of the heat-exchange catalyst unit 100 can vary and can range from 5 to 30 inches in width, 5 to 30 inches in length, and 0.5 to 12 inches in height.

In an embodiment, the heat-exchange catalyst unit 100 has a generally square shape which accommodates a square-shaped matrix 110, as shown in FIG. 1, which is an illustrative example only and is not intended to be in any way limiting. In other embodiments, the heat-exchange catalyst unit 100 can be any polygonal shape, such as, for example, oval, oblong, triangular, square, kite-shaped, trapezoid, parallelogram, rhombus, and the like, as well as various 3D shapes such as, for example, cube, cuboid, sphere, cone, and the like.

In an embodiment, the ammonia inlet 102 has a smaller diameter than the heated exhaust gas inlet 106, as the exhaust gas flow rate may be orders of magnitude higher than the ammonia flow rate. As with the dimensions of the heat-exchange catalyst unit 100, the diameters, shape, and sizes of the inlets 102, 106, and outlets 104, 108 can vary based on the power requirements of the motor vehicle and its engine.

Figure 2:
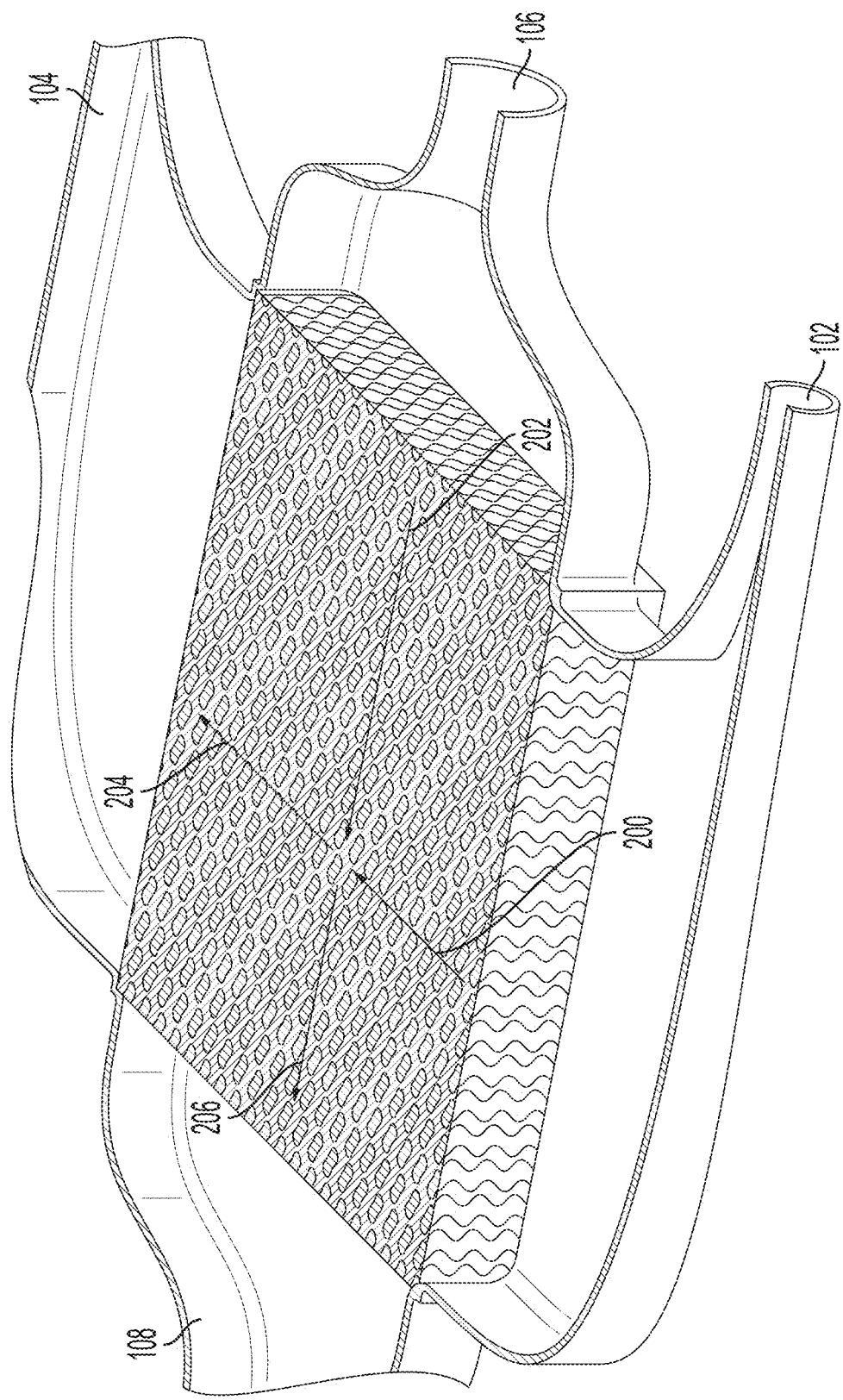
FIG. 2 is a perspective internal view of the heat-exchange catalyst unit that utilizes a TPMS structure which depicts the flow of heated exhaust gas and gaseous ammonia through the matrix, according to an embodiment of the present invention.

FIG. 2 is a perspective internal view of the heat-exchange catalyst unit 100 that utilizes a TPMS structure which depicts the flow of heated exhaust gas and gaseous ammonia through the matrix, according to an embodiment of the present invention. In operation, gaseous ammonia 200 is supplied to the inlet 102 and flows through the ammonia channels 116, while heated exhaust gas 202 is concurrently supplied to the inlet 106 and flows through the heated gas channels 118. The heated exhaust gas 202 heats the catalyst, resulting in cracking of the gaseous ammonia 200 into the hydrogen gas mixture 204. The hydrogen gas mixture 204 exits the heat-exchange catalyst unit 100 via the outlet 104 and are supplied to the downstream injection system for the engine, while residual exhaust gas 206 exits the heat-exchange catalyst unit via the outlet 108.

Figure 3:
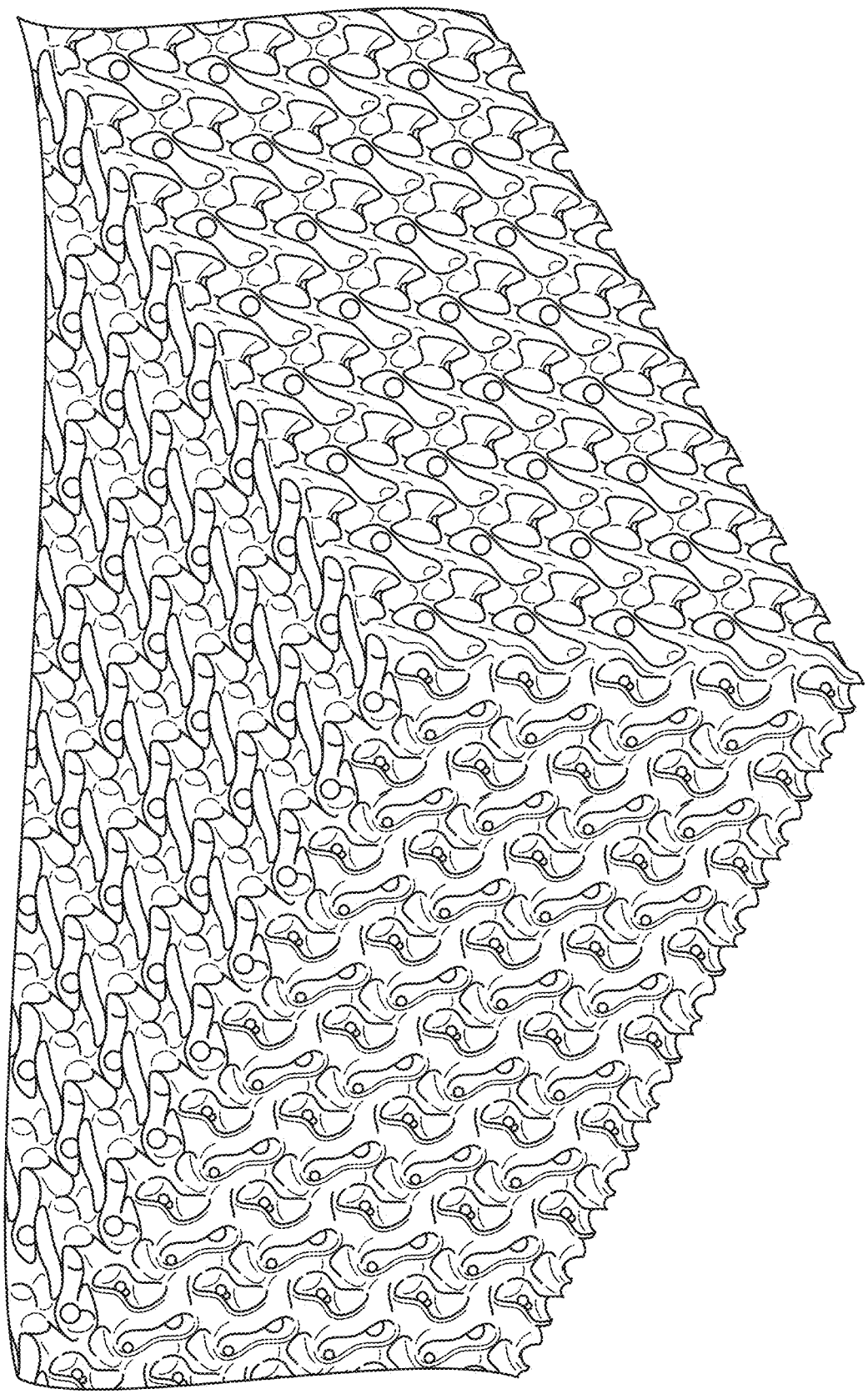
FIG. 3 is a perspective view of the matrix having a gyroid TPMS structure, according to an embodiment of the present invention.
Figure 4:
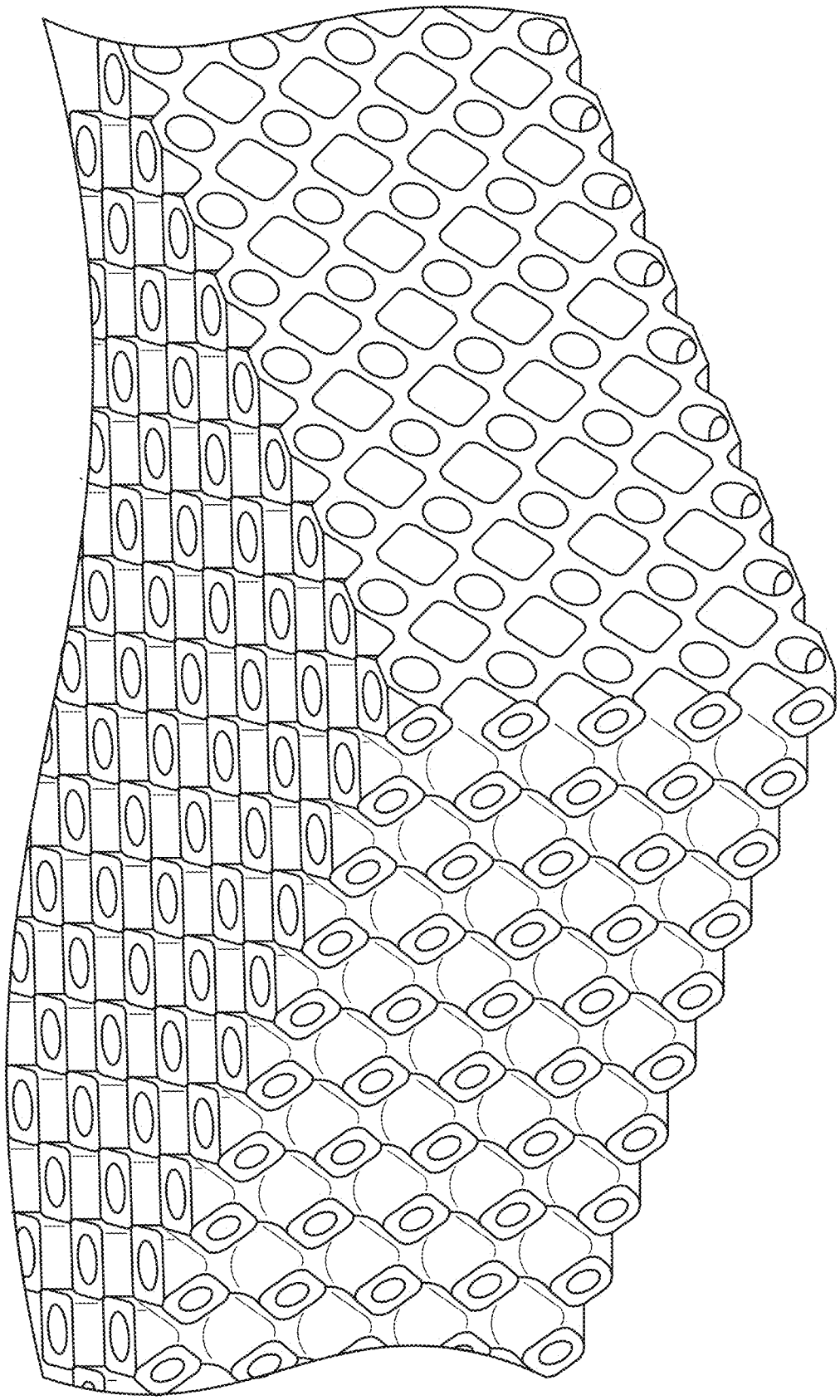
FIG. 4 is a perspective view of the matrix having an orthogonal hole TPMS structure, according to an embodiment of the present invention.
Figure 5:
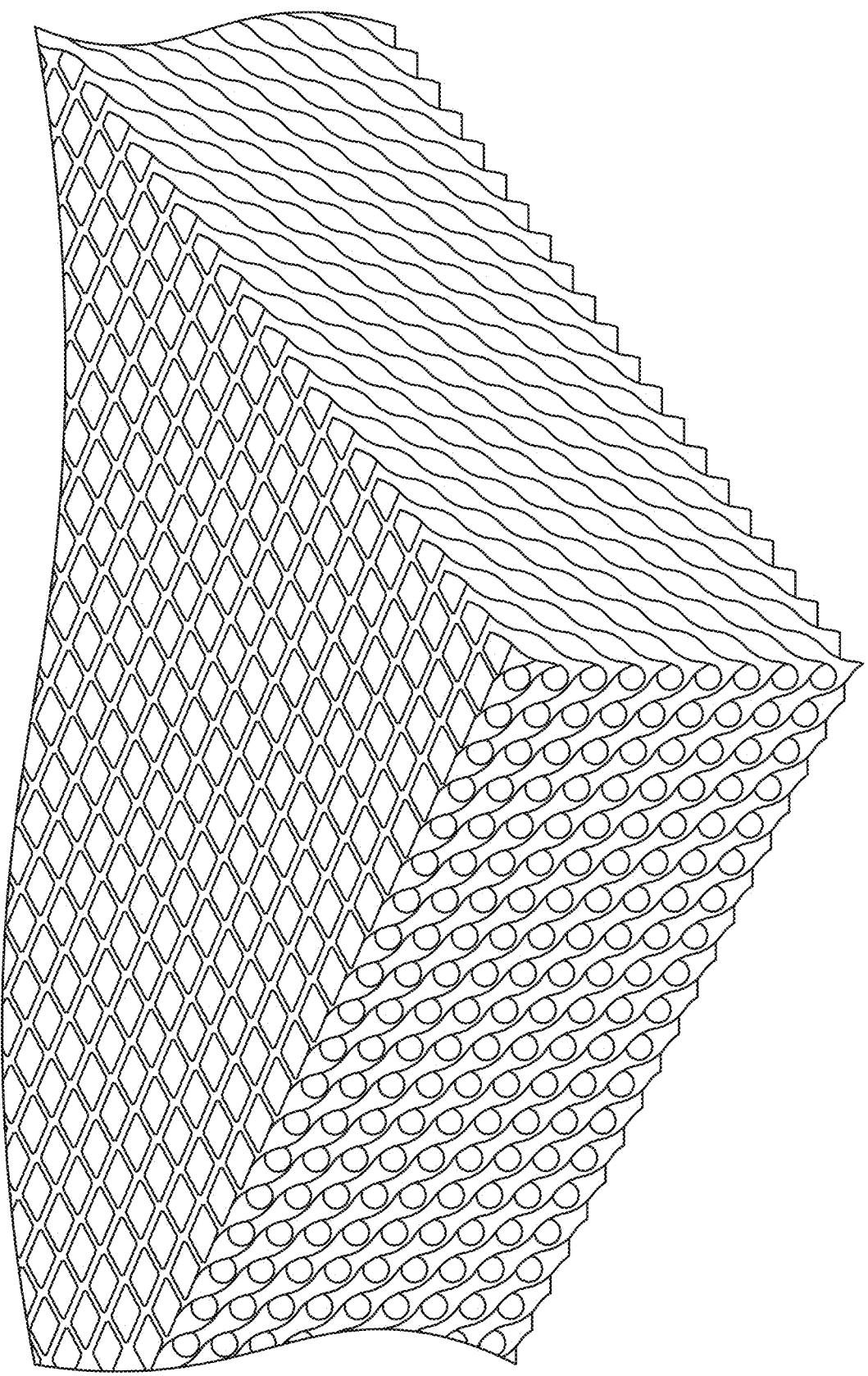
FIG. 5 is a perspective view of the matrix having a split pea TPMS structure, according to an embodiment of the present invention.

FIG. 3 is a perspective view of the matrix 110 having a gyroid TPMS structure, FIG. 4 is a perspective view of the matrix 110 having an orthogonal hole TPMS structure, and FIG. 5 is a perspective view of the matrix 110 having a split pea TPMS structure, according to an embodiment of the present invention. It is noted however, that the TPMS structures depicted in FIGS. 1 through 5 are illustrative examples only and are not intended to be in any way limiting.

Figure 6:
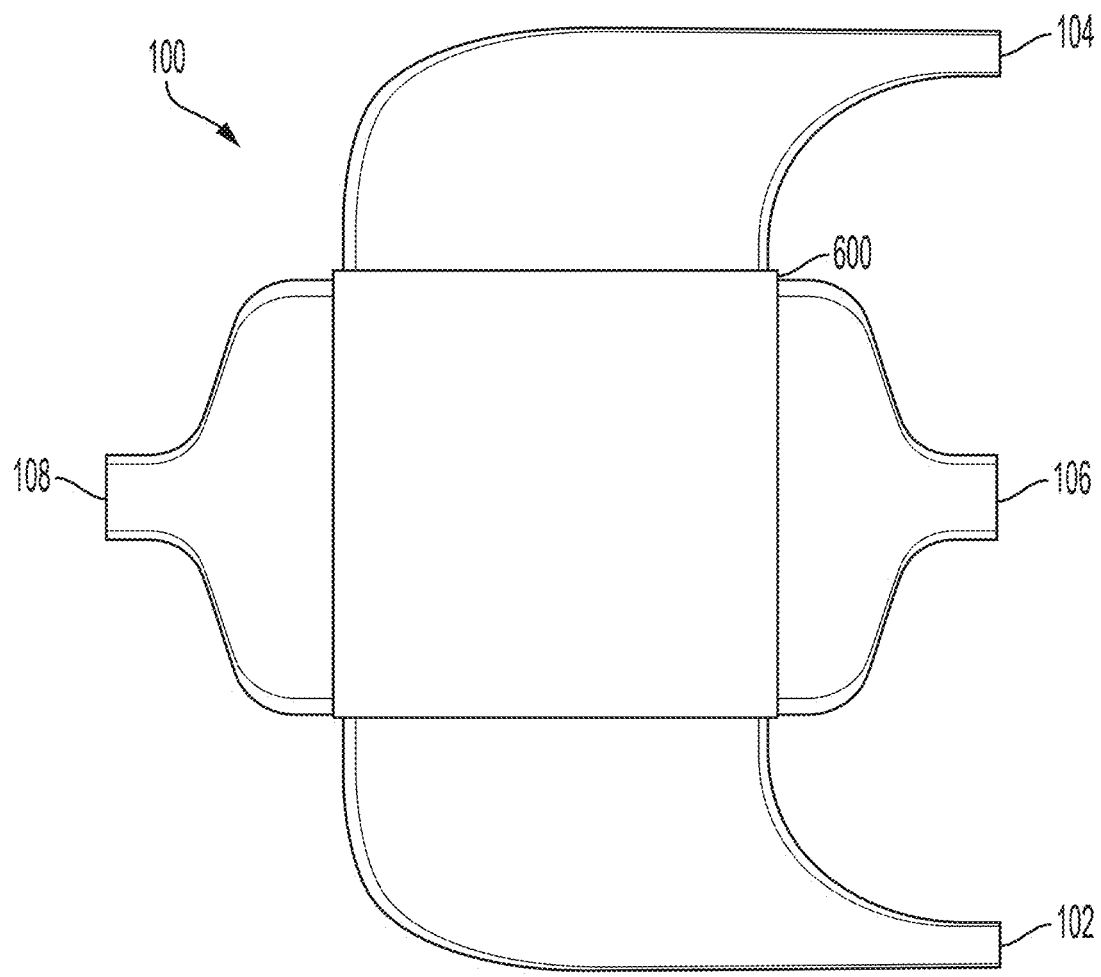
FIG. 6 is a top-down perspective view of the heat-exchange catalyst unit that utilizes a TPMS structure, according to an embodiment of the present invention.

FIG. 6 is a top-down perspective view of the heat-exchange catalyst unit 100 that utilizes a TPMS structure, according to an embodiment of the present invention. In an embodiment, the heat-exchange catalyst unit 100 can be manufactured via welding the inlets 102, 106 and outlets 104, 108 to a housing 600. In an embodiment, the housing 600 can include a cover (not depicted in FIG. 6) which can be removed to service or replace the matrix 110. In another embodiment, the inlets 102, 106 and/or the outlets 104, 108 can be removably attached to the housing 600 so that different inlets and outlets having various dimensions, sizes, and flow properties can be utilized with the housing 600 in a modular fashion.

Figure 7:
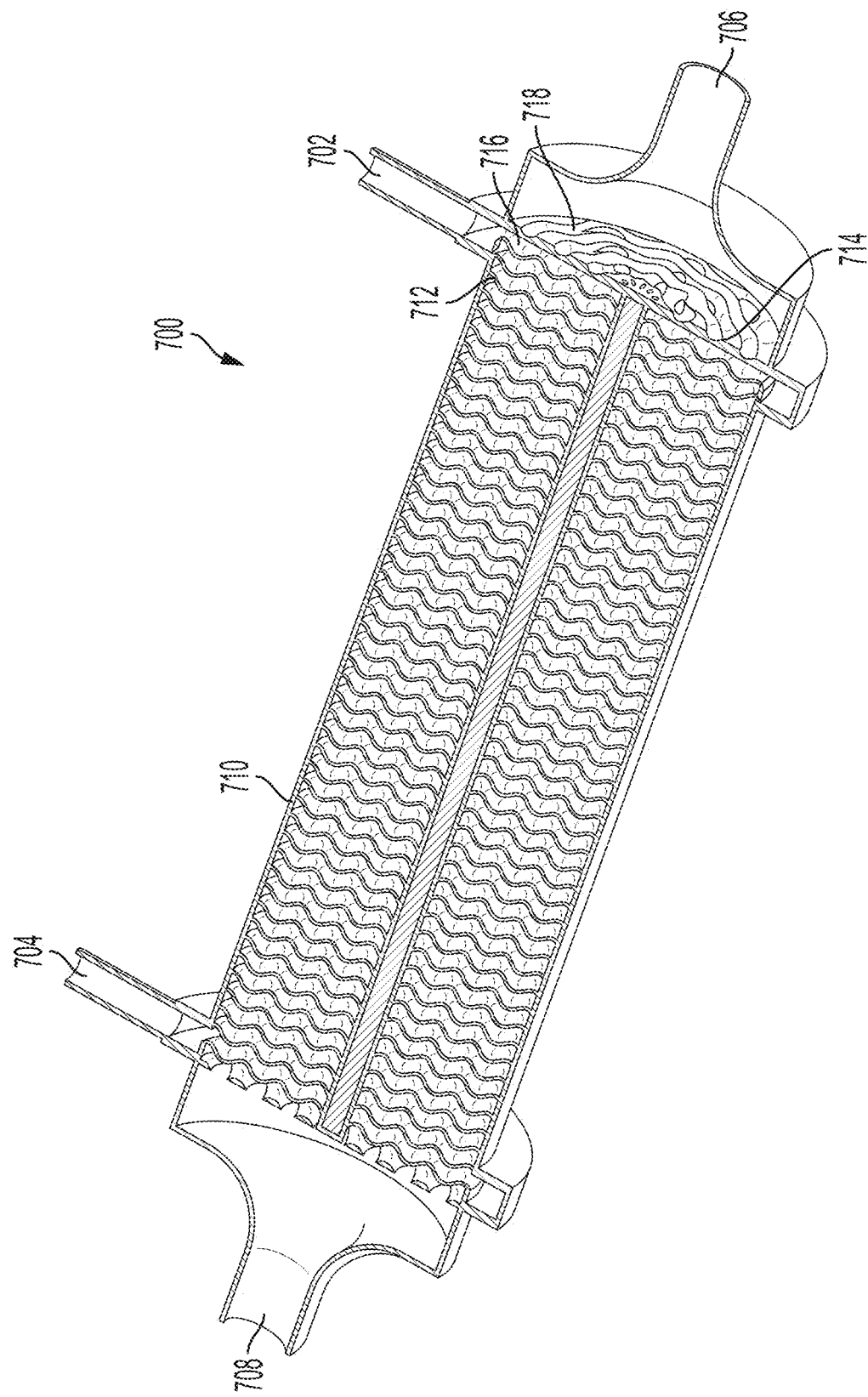
FIG. 7 is a front cross-sectional view of a cylindrical heat-exchange catalyst unit that utilizes a TPMS structure, according to an embodiment of the present invention.

FIG. 7 is a front cross-sectional view of a cylindrical heat-exchange catalyst unit 700 that utilizes a TPMS structure, according to an embodiment of the present invention. Similar to the heat-exchange catalyst unit 100 shown in FIG. 1, the cylindrical heat-exchange catalyst unit 700 is metallic and made from a nickel alloy, and in a preferred embodiment, the cylindrical heat-exchange catalyst unit 700 is made from Inconel® 625.

In an embodiment, the cylindrical heat-exchange catalyst unit 700 includes an ammonia inlet 702, a hydrogen outlet 704, a heated exhaust gas inlet 706, and an exhaust gas outlet 708. Positioned between the inlets 702, 706 and outlets 704, 708 is a matrix 710. The matrix 710 is formed from width-wise surfaces 712 and lengthwise surfaces 714 which run generally perpendicular to each other. The surfaces 712, 714 of the matrix 710 create passages allowing the gaseous ammonia and heated exhaust gas to flow; these passages are indicated by the ammonia channels 716 and heated exhaust gas channels 718.

Gaseous ammonia is supplied to cylindrical heat-exchange catalyst unit 700 via inlet 702, while heated exhaust gas is concurrently supplied to inlet 706. The gaseous ammonia traverses the matrix 710 axially, while the heated exhaust gas traverses the matrix laterally.

As shown in FIG. 7, the matrix 710 physically separates the gases passing through each of the channels 716, 718, thereby providing an exceptionally large surface area throughout the matrix 710 where the heated exhaust gas exchanges its heat with the gaseous ammonia. In an embodiment, the surfaces 712, 714 of the matrix 710 are coated with a catalyst that facilitates the cracking of ammonia into a hydrogen gas mixture. In this embodiment, the surfaces 712, 714 of the matrix 710 are coated with the catalyst using a washcoating or deposition technique to bind or adhere the catalyst to the surfaces 712, 714.

In another embodiment, catalyst in the form of discrete catalyst media is deposited into the passages forming the ammonia channels 716 and heated exhaust gas channels 718.

In yet another embodiment, the surfaces 712, 714 of the matrix 710 can be coated with a catalyst as described herein, and additional discrete catalyst media can be deposited into the passages forming the ammonia channels 716 and heated exhaust gas channels 718.

Figure 8:
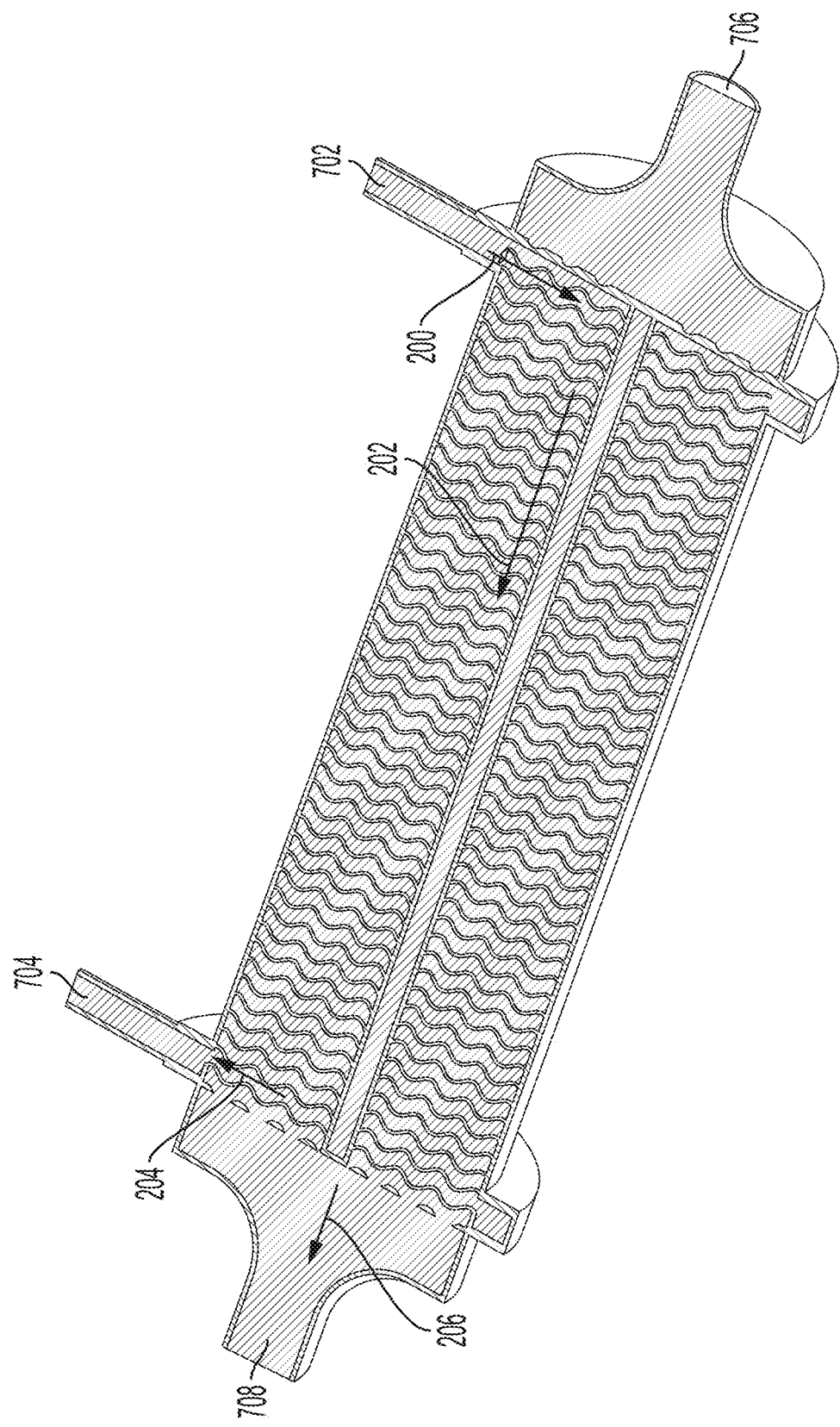
FIG. 8 is a front cross-sectional view of the cylindrical heat-exchange catalyst unit that utilizes a TPMS structure which depicts the flow of heated exhaust gas and gaseous ammonia through the matrix, according to an embodiment of the present invention.

FIG. 8 is a front cross-sectional view of the cylindrical heat-exchange catalyst unit 700 that utilizes a TPMS structure which depicts the flow of heated exhaust gas and gaseous ammonia through the matrix, according to an embodiment of the present invention. In operation, gaseous ammonia 200 is supplied to the inlet 702 and flows through the ammonia channels 716, while heated exhaust gas 202 is concurrently supplied to the inlet 706 and flows through the heated gas channels 718. The heated exhaust gas 202 heats the catalyst, resulting in cracking of the ammonia 200 into the hydrogen gas mixture 204. The hydrogen gas mixture 204 exits the heat-exchange catalyst unit 700 via the outlet 704 and are supplied to the downstream injection system for the engine, while residual exhaust gas 206 exits the heat-exchange catalyst unit via the outlet 708.

Thus, there is absolutely no fossil fuel supplied to the injection system for the engine as a primary fuel, promotor, co-fuel, additive, auxiliary fuel, or otherwise, as the resulting hydrogen and nitrogen components 204, alone or in combination with ammonia as a co-fuel, are utilized by the present invention as combustion fuel. The absence of carbon in the combustion fuel means that no carbon dioxide is produced by the internal combustion engine of the present invention, thus completely eliminating the primary greenhouse gas emission of a conventional gasoline or petroleum engine.

Figure 9:
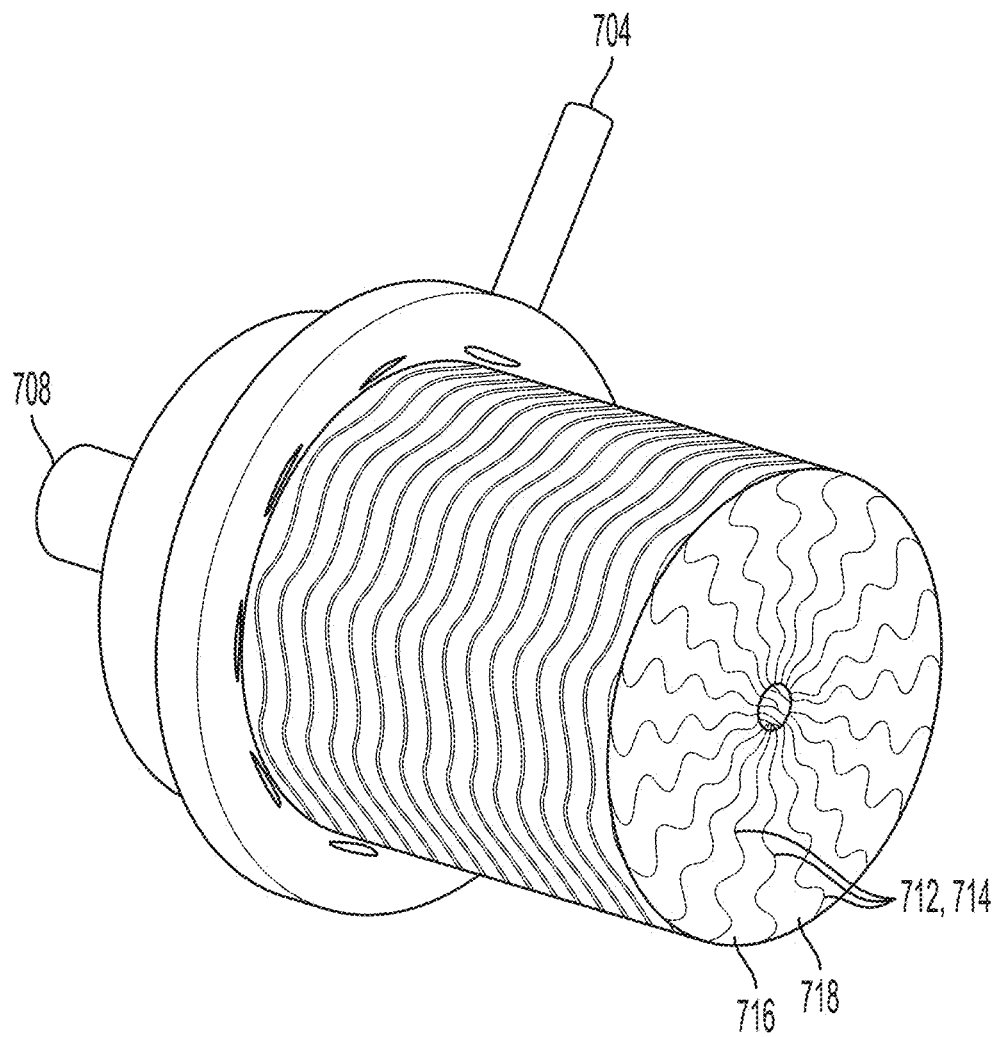
FIG. 9 is a side cross-sectional view of the cylindrical heat-exchange catalyst unit that utilizes a TPMS structure which depicts the flow of heated exhaust gas and gaseous ammonia through the matrix, according to an embodiment of the present invention.

FIG. 9 is a side cross-sectional view of the cylindrical heat-exchange catalyst unit 700 that utilizes a TPMS structure which depicts the flow of heated exhaust gas and gaseous ammonia through the matrix, according to an embodiment of the present invention. As shown in FIG. 9, the surfaces 712, 714 of the matrix 710 creates ammonia channels 716 and heated exhaust gas channels 718. The cylindrical design can provide efficiencies for mass production, given the rounded parts, fewer welded seams/joints compared to square and rectangular designs, and less susceptibility to thermal stress.

It is noted that cylindrical shape of the cylindrical heat-exchange catalyst unit 700 is an illustrative example only and is not intended to be in any way limiting. In other embodiments, the heat-exchange catalyst unit 700 can be any polygonal shape, such as, for example, oval, oblong, triangular, square, kite-shaped, trapezoid, parallelogram, rhombus, and the like, as well as various 3D shapes such as, for example, cube, cuboid, sphere, cone, and the like.

Figure 10:
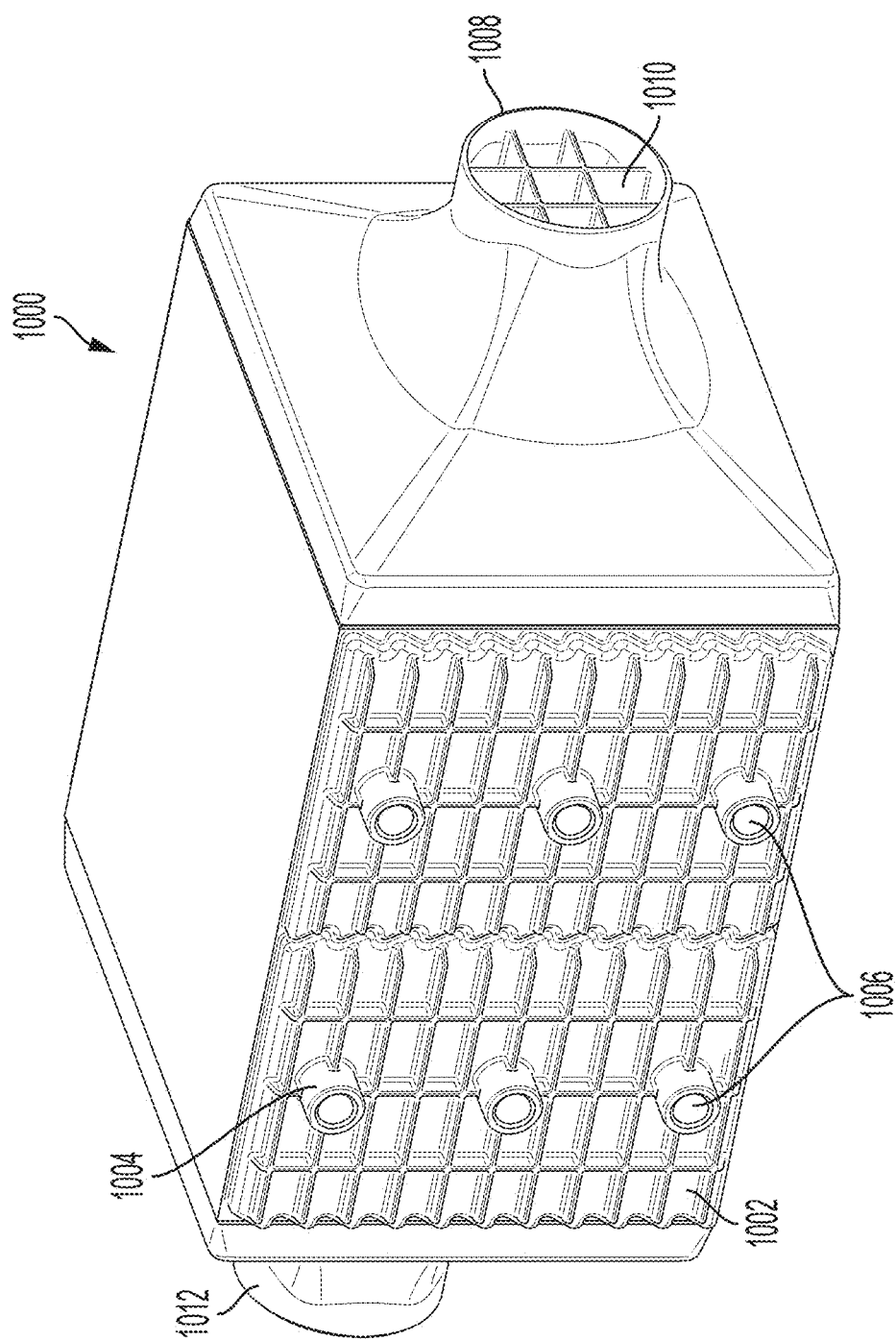
FIG. 10 is a perspective view of a heat-exchange catalyst unit that utilizes a tube bundle structure, according to an embodiment of the present invention.

FIG. 10 is a perspective view of a heat-exchange catalyst unit 1000 that utilizes a tube bundle structure, and which serves as a heat-exchanger as well as a catalytic converter that performs ammonia cracking, according to an embodiment of the present invention. The heat-exchange catalyst unit 1000 is metallic, and in an embodiment, includes a sidewall 1002 that includes a gaseous ammonia inlet 1004. In an embodiment, the inlet sidewall 1002 can include additional ports 1006 that may be used for a variety of functions. For example, the ports 1006 may serve an inlets, or may be coupled to equipment for temperature, throughput, and/or pressure sensing.

The heat-exchange catalyst unit 1000 further includes a heated gas inlet 1008. In an embodiment, the heated exhaust gas inlet 1008 includes a divider 1010 which spreads the heated exhaust gas from the engine evenly over the internal tube bundle structure contained within the heat-exchange catalyst unit 1000, as described in more detail with reference to FIG. 11. In an embodiment, the divider 1010 can have a grid or lattice structure.

The heat-exchange catalyst unit 1000 includes an exhaust gas outlet 1012 positioned opposite the heated gas inlet 1008.

Figure 11:
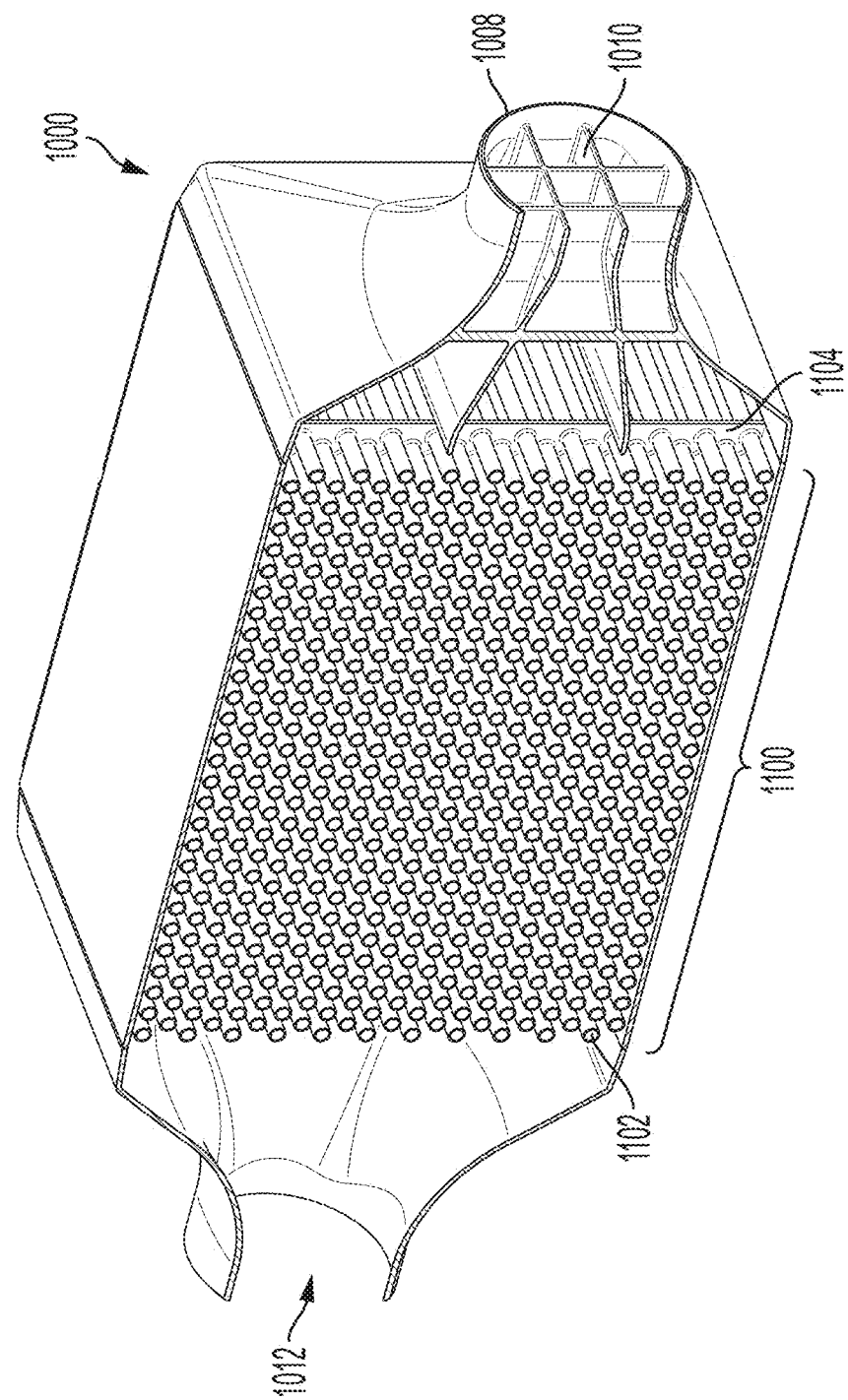
FIG. 11 is a front cross-sectional view of the heat-exchange catalyst unit that utilizes a tube bundle structure, according to an embodiment of the present invention.

FIG. 11 is a front cross-sectional view of the heat-exchange catalyst unit 1000 that utilizes a tube bundle structure, according to an embodiment of the present invention. In an embodiment, a tube bundle structure 1100 is disposed within the heat-exchange catalyst unit 1000. The tube bundle structure 1100 is comprised of individual tubes 1102 which extend along the width of the heat-exchange catalyst unit 1000 from the sidewall 1002, perpendicular to the inlet 1008 and outlet 1012.

In an embodiment, the tube bundle structure 1100 includes rows and/or columns of tubes 1102 arranged in an offset fashion so that each adjacent row and/or column includes tubes which are offset from its neighboring tubes. This pattern maximizes the surface area contacted by the heated exhaust gas as the gas traverses the tube bundle structure 1100, thereby maximizing the amount of catalyst heated to facilitate the cracking process.

In an embodiment, the heat-exchange catalyst unit 1000 includes at least one support structure 1104 which facilitates the 3D printing process, and further provide stability against thermal stress during operation of the heat-exchange catalyst unit 1000.

Gaseous ammonia is supplied to the heat-exchange catalyst unit 1000 via inlet 1004, while heated exhaust gas concurrently is supplied to the inlet 1008. The gaseous ammonia traverses the lateral spaces between the tubes 1102, while the heated exhaust gas traverses the axial space inside the tubes 1102.

In an embodiment, the spaces between the tubes 1102 are filled with a catalyst in the form of a discrete catalyst media. In another embodiment, the tubes 1102 themselves are hollow and are also filled with the discrete catalyst media.

In yet another embodiment, the external surfaces and/or the internal surfaces of the tubes 1102 are also coated with the catalyst using a washcoating or deposition technique to bind or adhere the catalyst to the surfaces.

Figure 12:
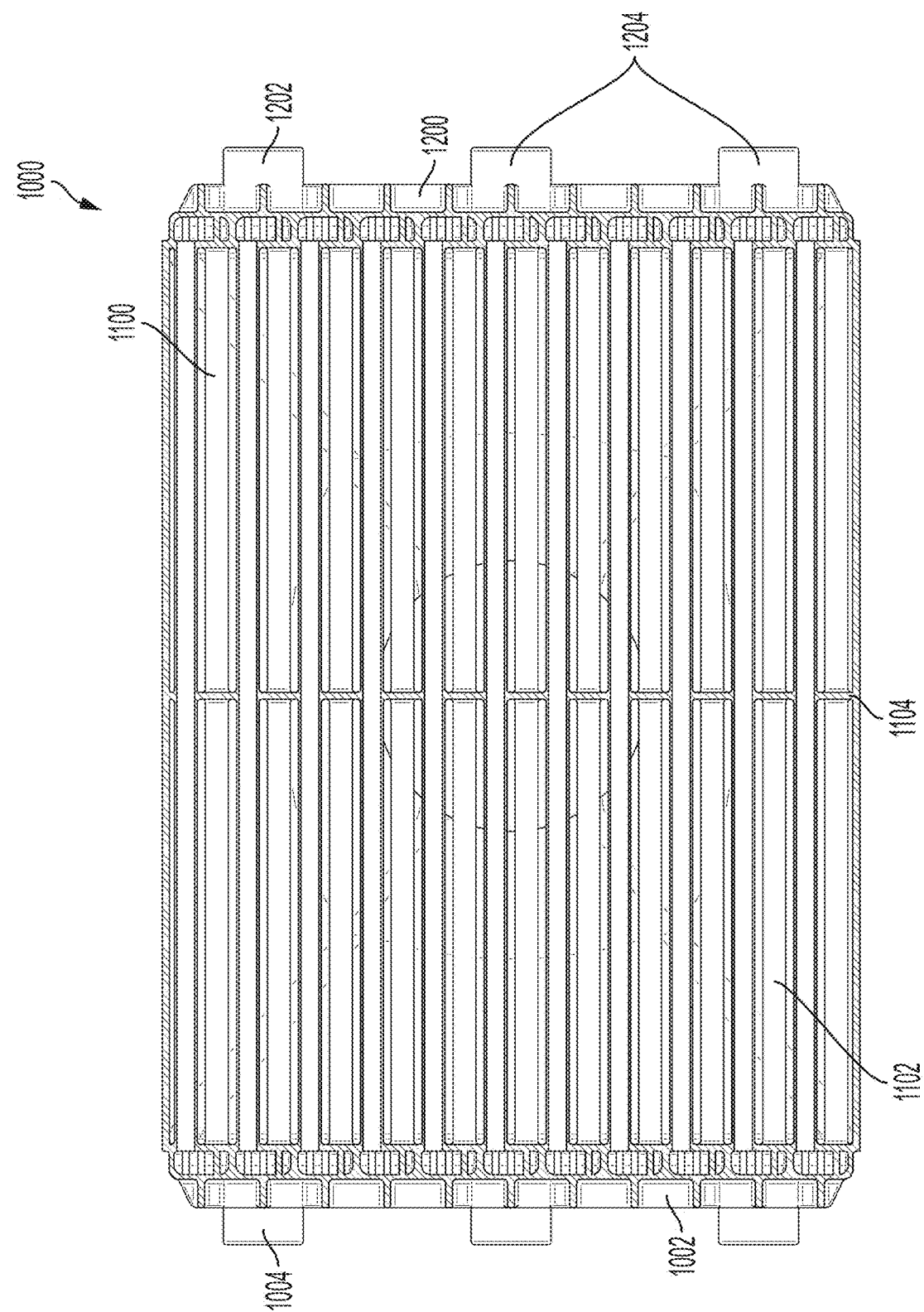
FIG. 12 is a side cross-sectional view of the heat-exchange catalyst unit that utilizes a tube bundle structure, according to an embodiment of the present invention.

FIG. 12 is a side cross-sectional view of the heat-exchange catalyst unit 1000 that utilizes a tube bundle structure 1100, according to an embodiment of the present invention. In an embodiment, the heat-exchange catalyst unit 1000 includes a sidewall 1200 positioned opposite the sidewall 1002. The sidewall 1200 includes a hydrogen outlet 1202 and can include additional ports 1204 that may be used for a variety of functions. For example, the ports 1204 may serve as outlets, or may be coupled to equipment for temperature, throughput, and/or pressure sensing.

In operation, gaseous ammonia is supplied to the inlet 1004, while heated exhaust gas is concurrently supplied to the inlet 1008. The heated exhaust gas heats the catalyst, resulting in cracking of the ammonia into a hydrogen gas mixture. The resulting hydrogen gas mixture exits the heat-exchange catalyst unit 1000 via the outlet 1202 and are supplied to the downstream engine.

In an embodiment, the heat-exchange catalyst unit 1000 is made from a nickel alloy. In a preferred embodiment, the heat-exchange catalyst unit 1000 is made from Inconel® 625.

In an embodiment, the sidewalls 1002, 1200, the gaseous ammonia inlet 1004, the hydrogen outlet 1202, the heated exhaust gas inlet 1008, the divider 1010, the exhaust gas outlet 1012, and the support structures 1104 can be made from the same metallic material as the heat-exchange catalyst unit 1000. In another embodiment, the sidewalls 1002, 1200, the gaseous ammonia inlet 1004, the divider 1010, the hydrogen outlet 1202, the heated exhaust gas inlet 1008, and the exhaust gas outlet 1012 can be made from stainless steel, silver, bronze, and comparable alloys.

Figure 13:
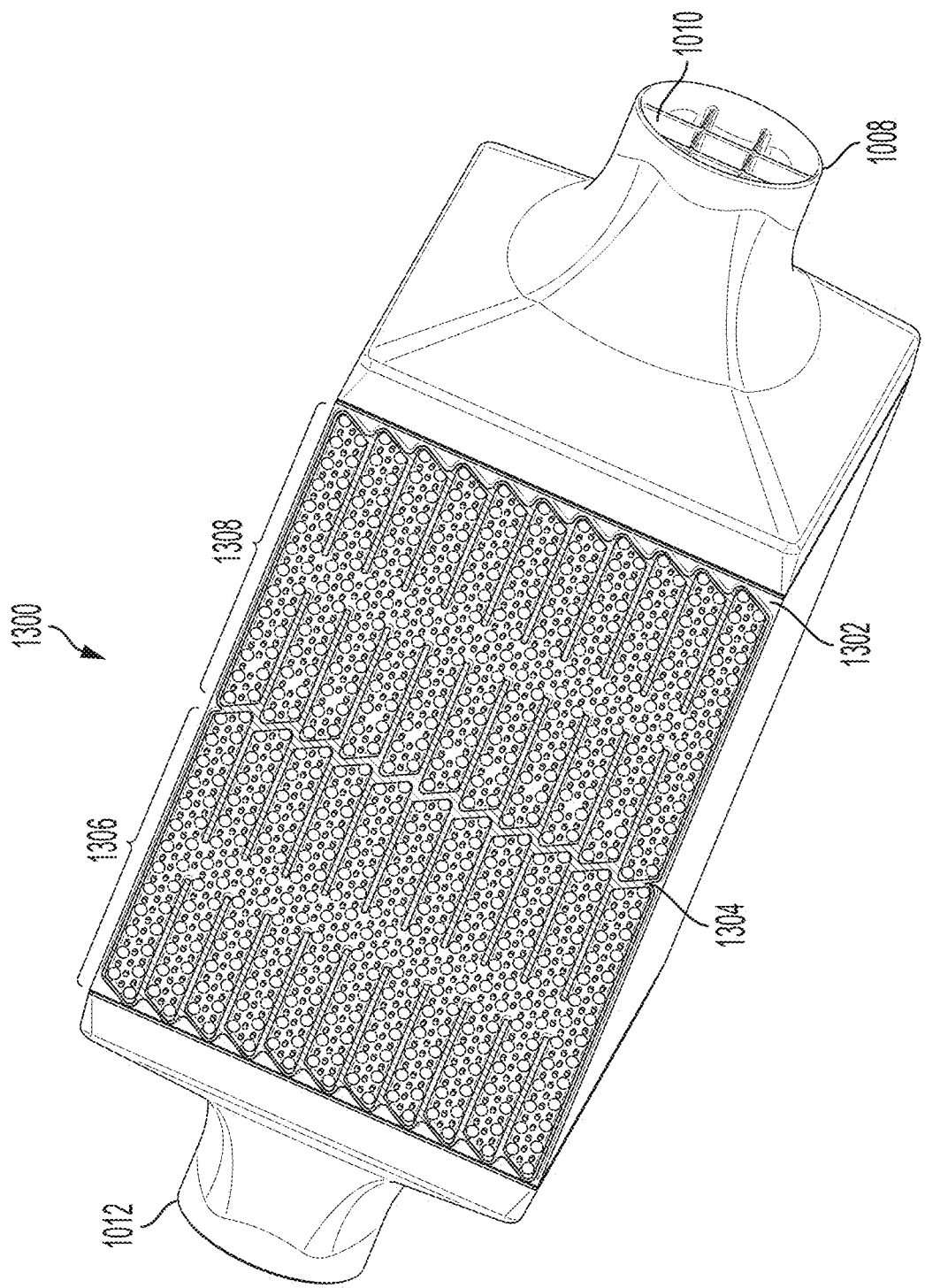
FIG. 13 is a front cross-sectional view of a two-pass heat-exchange catalyst unit that utilizes a tube bundle structure, according to an embodiment of the present invention.

FIG. 13 is a front cross-sectional view of a two-pass heat-exchange catalyst unit 1300 that utilizes a tube bundle structure 1100, according to an embodiment of the present invention. In this embodiment, the support structure 1302 includes a fascia that receives a sidewall (not depicted in FIG. 13). The support structure 1302 includes a divider 1304 which physically separates the tube bundle structure 1100 into a left section 1306 and right section 1308. The divider 1304 extends along the width of the two-pass heat-exchange catalyst unit 1300 between the two sidewalls. In this embodiment, a gaseous ammonia inlet is positioned on a sidewall covering the left section 1306, and a hydrogen outlet is positioned on a sidewall covering the right section 1308.

In operation, gaseous ammonia is supplied to the gaseous ammonia inlet, while heated exhaust gas is concurrently supplied to the inlet 1008. As the ammonia traverses the left section 1306 of tube bundle structure 1100, heated exhaust gas heats the catalyst, resulting in cracking of the ammonia into a hydrogen gas mixture. The remaining ammonia traverses back through the right section 1308 of the tube bundle structure 1100 and continues to undergo cracking, thereby providing a two-pass cracking process. The resulting hydrogen gas mixture exits the two-pass heat-exchange catalyst unit 1300 via the hydrogen outlet and are supplied to the downstream engine.

Figure 14:
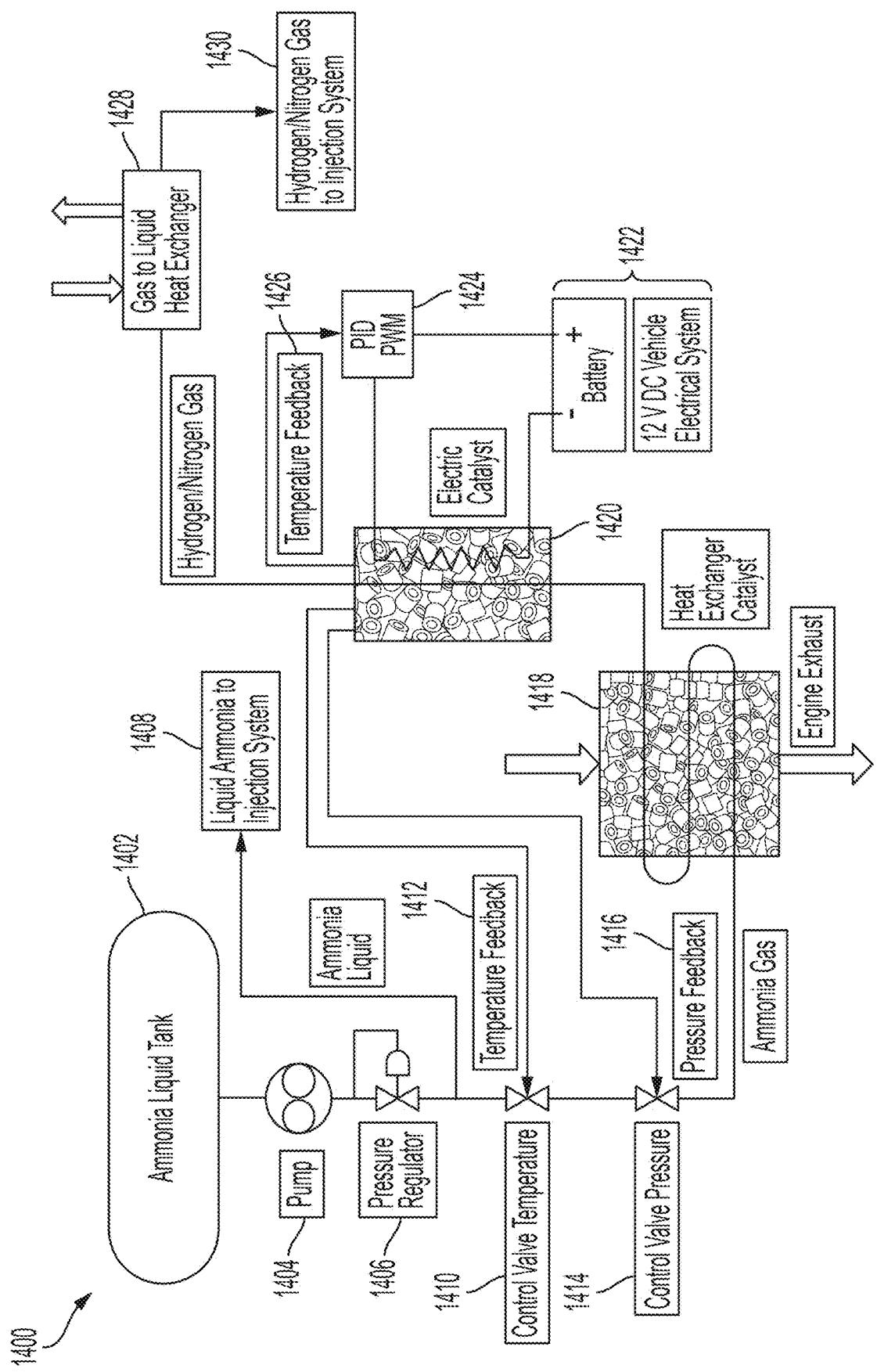
FIG. 14 is a block diagram of an on-board ammonia cracking system for an internal combustion engine, according to an embodiment of the present invention.

FIG. 14 is a block diagram of an on-board ammonia cracking system for an internal combustion engine, according to an embodiment of the present invention. The on-board ammonia cracking system 1400 provides a mechanism to generate hydrogen from ammonia which eliminates the need for a separate hydrogen tank to be carried by the motor vehicle.

Referring FIG. 14, a liquid ammonia tank 1402 is mounted to a motor vehicle or engine, and in an embodiment, the liquid ammonia tank 1402 can be coupled to a pump 1404. In an embodiment, the tank 1402 is refillable and/or replaceable. The pump 1404 can be coupled to a port on the tank 1402 to facilitate the delivery of ammonia from the tank 1402. For example, in a cold environment where the temperature is approximately 0° C. or less, the vapor pressure of ammonia is not adequate to push itself out of the tank 1402. Thus, the pump 1404 is required to draw or force the ammonia out of the tank 1402.

In an embodiment, multiple liquid ammonia tanks could be mounted to the motor vehicle or engine, where each ammonia tank supplies ammonia to a separate on-board cracking system, as described herein with respect to FIGS. 20-23.

In another embodiment, an electrical heater (not depicted in FIG. 14) can be coupled to the tank 1402, such as within the tank 1402 or on an outer surface of the tank 1402, to heat the liquid ammonia contained within the tank 1402 to a temperature where it vaporizes into a gaseous form.

In an embodiment, a pressure regulator 1406 is coupled to an outlet of the tank 1402 and serves to control the volume and/or flow rate of ammonia drawn out of the tank 1402 by the pump 1404. The pressure regulator 1406 monitors the pressure of the liquid ammonia in the tank 1402. Once the pressure lowers to a threshold pressure value whereby the liquid ammonia can vaporize into a gaseous form, the pressure regulator 1406 opens and feeds gaseous ammonia downstream. Any residual liquid ammonia that passes through the pressure regulator 1406 is fed to an injection system 1408 (via, for example, a T-coupling on a supply line).

In an embodiment, a temperature control valve 1410 receives a temperature feedback signal 1412 that contains a temperature reading from an electric catalyst unit 1420 during a cold start of the engine. The temperature feedback signal 1412 can be generated by a temperature sensor coupled to the electric catalyst unit 1420. Once the electric catalyst unit 1420 reaches a threshold temperature (i.e., the temperature reading is equal to or greater than the threshold temperature) suitable to perform the ammonia cracking process, the temperature control valve 1410 opens and the gaseous ammonia passes through the heat-exchange catalyst unit 1418, and travels downstream to the electric catalyst unit 1420, which is heated using power supplied from the vehicle power system 1422.

If the electric catalyst unit 1420 has not reached the threshold temperature, then the temperature control valve 1410 continues to monitor the temperature feedback signal 1412 and prevents the downstream travel of the gaseous ammonia. The cold start operation is described in more detail herein.

In an embodiment, the temperature of the heated exhaust gas entering the heat-exchange catalyst unit 1418 is judged based on the current draw in the electric catalyst unit 1420, where the current draw is indicative of how effective the heat-exchange catalyst unit 1418 is in cracking the gaseous ammonia.

For example, if there is hydrogen and nitrogen passing from the heat-exchange catalyst unit 1418 to the electric catalyst unit 1420, the electric catalyst unit 1420 will not perform the ammonia cracking process, and thus will draw minimal or no current.

If, however, gaseous ammonia passes from the heat-exchange catalyst unit 1418 to electric catalyst unit 1420, the ammonia cracking process will occur, drawing current to heat the heating element disposed within the electric catalyst unit 1420.

However, during a normal or high load operating conditions of the engine (i.e., not during a cold start or low load operating conditions), the on-board ammonia cracking system 1400 does not utilize the electric catalyst unit 1420 to perform the ammonia cracking process, and the heat-exchange catalyst unit 1418 performs the ammonia cracking process as it will have been heated to the threshold temperature by the heated exhaust gas from the engine.

The heat-exchange catalyst unit 1418 referred to in FIG. 14 can be any of the embodiments described herein—the heat-exchange catalyst unit 100 that utilizes a TPMS structure, the cylindrical heat-exchange catalyst unit 700 that utilizes a TPMS structure, the heat-exchange catalyst unit 1000 that utilizes a tube bundle structure, the two-pass heat-exchange catalyst unit 1300 that utilizes a tube bundle structure, or a plate heat-exchange unit as described in U.S. Non-Provisional patent application Ser. No. 18/241,321 entitled "SYSTEMS AND METHODS FOR THE ON-BOARD CATALYTIC PRODUCTION OF HYDROGEN FROM AMMONIA USING A PLATE HEAT EXCHANGE CATALYST UNIT" filed on Sep. 1, 2023, which is commonly owned, and the disclosure of which is incorporated herein by reference in its entirety.

The pressure control valve 1414 is located in series with the temperature control valve 1410 and controls the amount of gaseous ammonia which is fed into the heat-exchange catalyst unit 1418.

In an embodiment, the pressure control valve 1414 receives a pressure feedback signal 1416 from the heat-exchange catalyst unit 1418. For example, the heat-exchange catalyst unit 1418 can be coupled to a pressure transducer or the like (not depicted in FIG. 14) that generates the pressure feedback signal 1416.

In an embodiment, to facilitate a cold start of the on-board ammonia cracking system 1400 when the exhaust gas from the engine is not at a threshold temperature suitable to perform the ammonia cracking process, the electric catalyst unit 1420 is used to heat the catalyst so that the gaseous ammonia can be cracked, and the resulting hydrogen is to be supplied to the downstream injection system for the engine. The engine can then burn the hydrogen, powering the engine which results in heated exhaust gas being supplied to the on-board ammonia cracking system 1400.

In an embodiment, the electric catalyst unit 1420 is coupled to the vehicle power system 1422, such as a traditional vehicle battery. In another embodiment, the electric catalyst unit 1420 can be heated via a supplemental heating/electric source, such as a renewable energy source, a portable battery source, an on-board electric battery pack, and/or a rechargeable battery.

In addition to facilitating a cold start of the on-board ammonia cracking system 1400, the electric catalyst unit 1420 is utilized to supplement the heat-exchange catalyst unit 1418 during low load operating conditions of the engine, such as when the vehicle is stopped, moving slowly, or idling. For example, during low load operating conditions, the engine exhaust gas temperature can drop significantly. The reduced temperature of the exhaust gas flowing into the heat-exchange catalyst unit 1418 during such low load operating conditions may not be sufficient for the catalyst to crack the ammonia. In an embodiment, depending on the specific catalyst that is utilized, the temperature of the exhaust gas needs to be at least 400° C. to 700° C. in order to perform the ammonia cracking process, and in a preferred embodiment, the temperature of the exhaust gas is at least 600° C. in order to perform the ammonia cracking process.

In this scenario, the cold gaseous ammonia will pass through the heat-exchange catalyst unit 1418 and will be supplied downstream to the electric catalyst unit 1420, which is heated using power supplied from the vehicle power system 1422. Once the electric catalyst unit 1420 is heated to a threshold temperature suitable to perform the ammonia cracking process, the temperature control valve 1410 opens and allows the gaseous ammonia to be fed to the heat-exchange catalyst unit 1418 and ultimately to the electric catalyst unit 1420. The electric catalyst unit 1420 then performs the ammonia cracking process, and the resulting hydrogen is supplied to the downstream injection system for the engine.

When the exhaust gas flowing into the heat-exchange catalyst unit 1418 reaches a threshold temperature suitable to perform the ammonia cracking process, such as during normal or high load operating conditions of the engine, the ammonia cracking process occurs within the heat-exchange catalyst unit 1418. The resulting hydrogen and nitrogen will pass downstream through the electric catalyst unit 1420, and further downstream to a gas-to-liquid or gas-to-gas heat-exchange unit 1428, and subsequently to the injection system 1430 for the engine. In an embodiment, the gas-to-liquid or gas-to-gas heat-exchange unit 1428 may leverage engine coolant and/or the engine radiator, or input ammonia gas or liquid, to facilitate the heat-exchange process.

In an embodiment, the pressure regulator 1406 can be controlled with an electric servomotor to provide a steady flow of gaseous ammonia from the tank 1402. In another embodiment, a pulse-width modulated injection valve can be used. The servomotor and/or pulse generators can be controlled using an electronic controller, such as an industrial PID controller (not depicted in FIG. 14).

In an embodiment, the electronic controller can be coupled to various components of the on-board ammonia cracking system 1400 to receive inputs from the pressure regulator 1406, the temperature control valve 1410, pressure control valve 1414, as well as from sensors such as temperature sensors and pressure transducers which may be coupled to the heat-exchange catalyst unit 1418 and/or electric catalyst unit 1420.

In another embodiment, the electronic controller can be integrated into the hardware and software with the vehicle's electronic control unit (ECU). In this embodiment, the flow rate of hydrogen fed to the injection system of the engine can be measured and reported back to the ECU as a mechanism to control the injection strategy.

Figure 15:
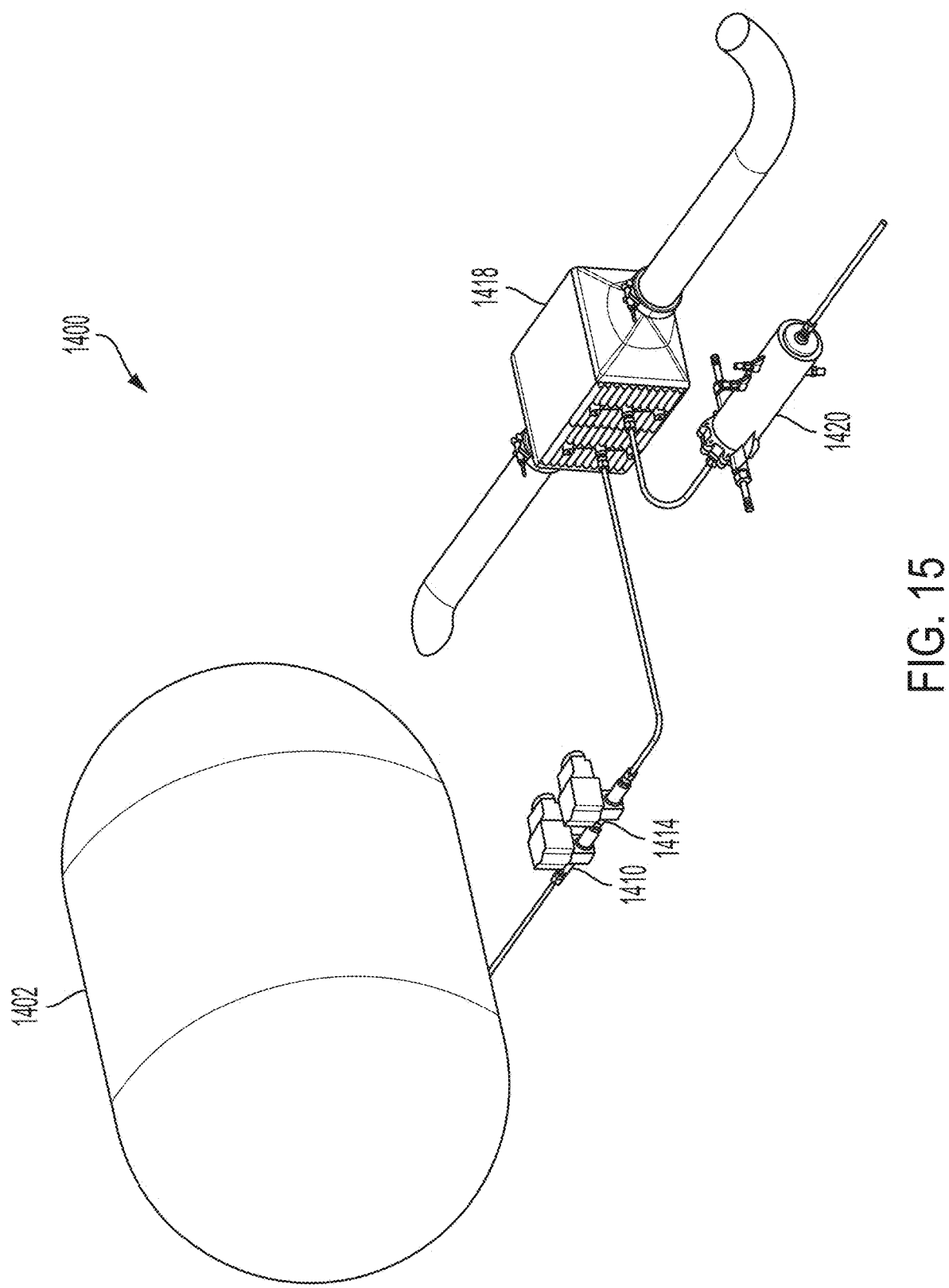
FIG. 15 is a perspective view of an on-board ammonia cracking system for an internal combustion engine, according to an embodiment of the present invention.
Figure 16:
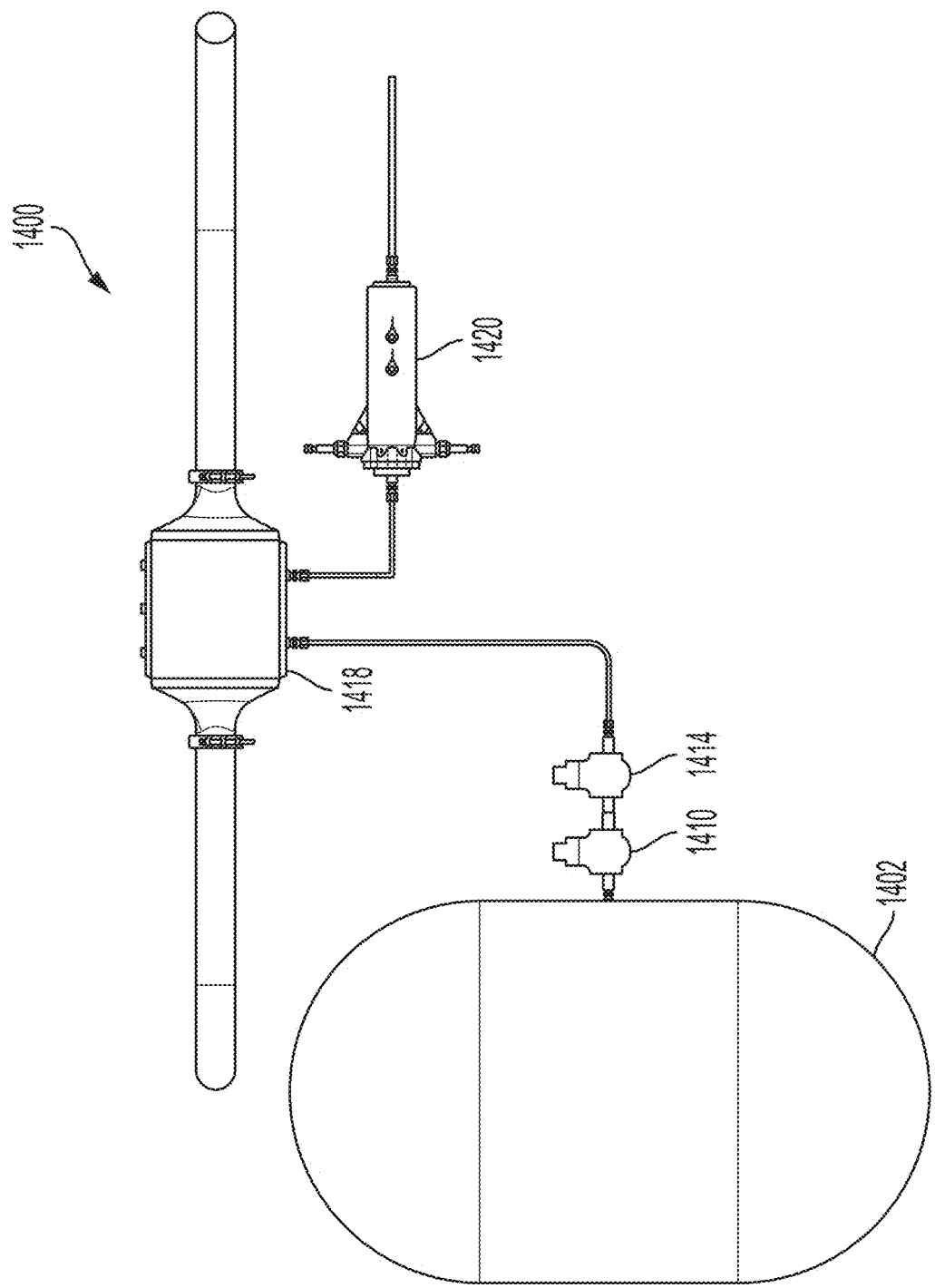
FIG. 16 is a top-down perspective view of the on-board ammonia cracking system, according to an embodiment of the present invention.
Figure 17:
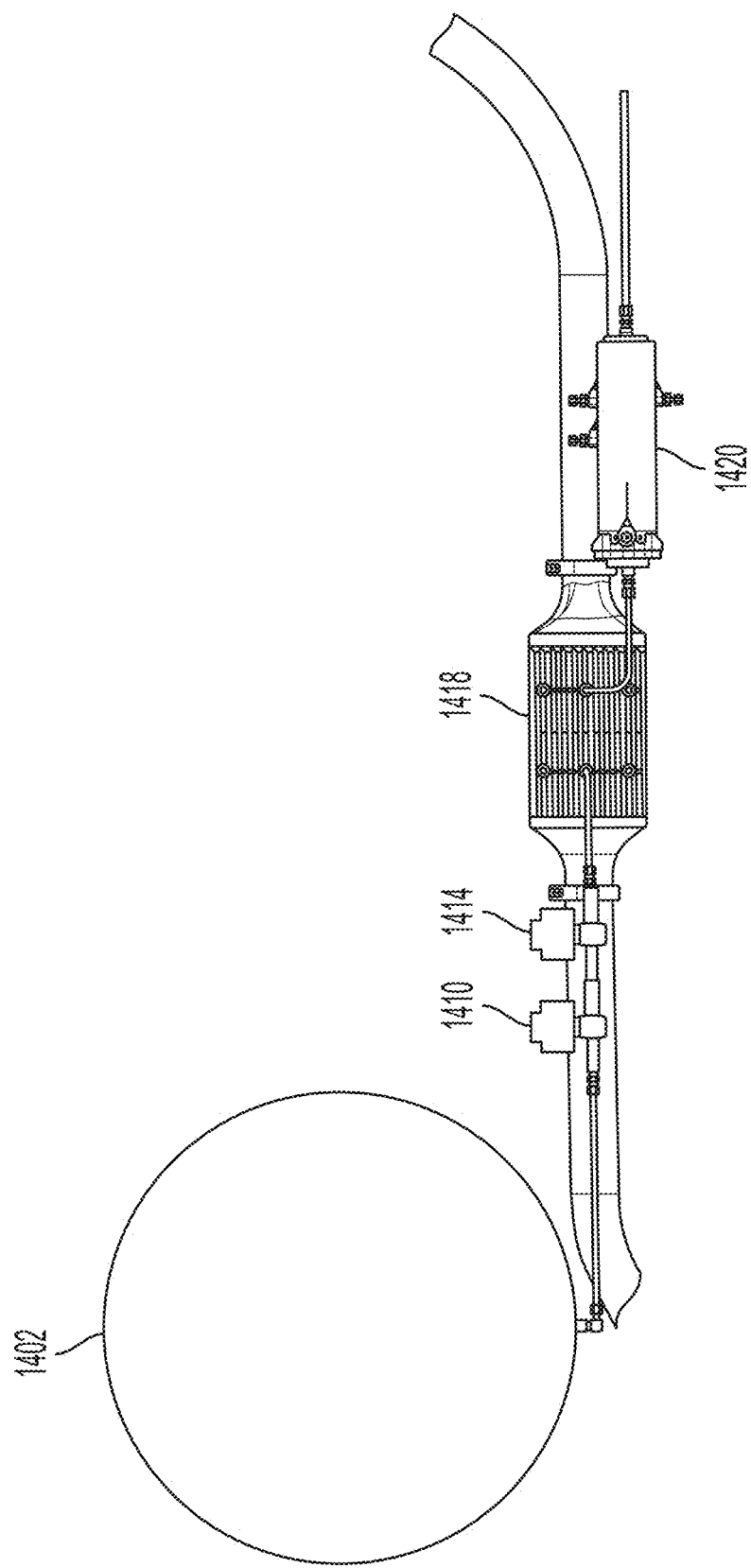
FIG. 17 is a perspective side view of the on-board ammonia cracking system, according to an embodiment of the present invention.

FIGS. 15-17 are various perspective views of the on-board ammonia cracking system 1400 for an internal combustion engine described in FIG. 14, according to an embodiment of the present invention.

Figure 18:
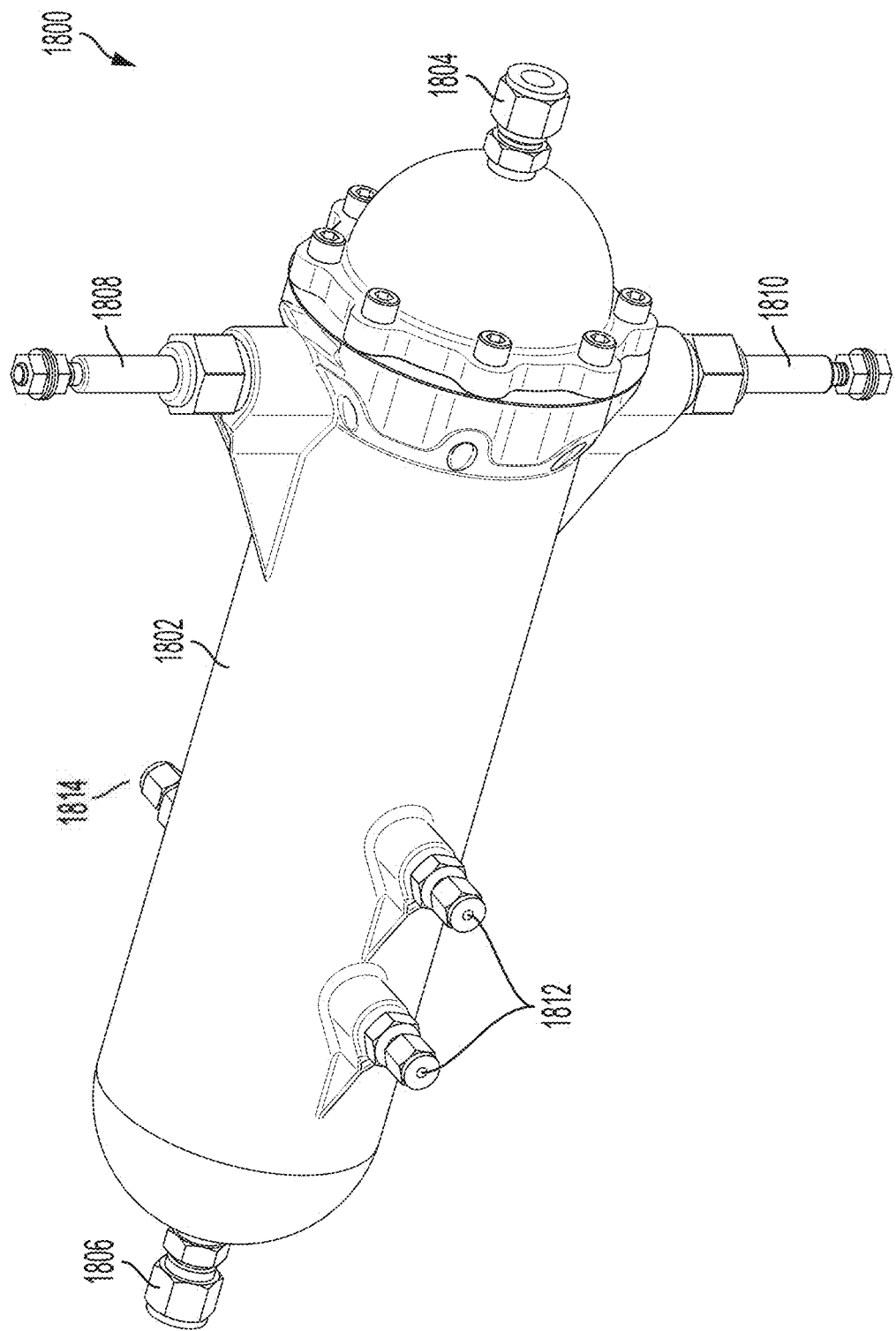
FIG. 18 is a perspective view of an electric catalyst unit, according to an embodiment of the present invention.

FIG. 18 is a perspective view of an electric catalyst unit. In an embodiment, the electric catalyst unit 1800 comprises a housing 1802 which encloses a ceramic tube 1900 (depicted in FIG. 19), according to an embodiment of the present invention. In an embodiment, the housing 1802 is a metal housing.

In an embodiment, the electric catalyst unit 1800 includes a gaseous ammonia inlet 1804 and a hydrogen outlet 1806 disposed on the opposite end of the electric catalyst unit 1800. The electric catalyst unit further includes power feed-throughs 1808, 1810 for the heating element 1904 (depicted in FIG. 19). In an embodiment, the electric catalyst unit 1800 can include radial fittings 1812, 1814 that may be used for a variety of functions. For example, the radial fittings 1812, 1814 may serve an inlets, outlets, or may be coupled to equipment for temperature, throughput, and/or pressure sensing. In an embodiment, the radial fittings 1812 can each include, or be coupled to, thermocouples, and the radial fitting 1814 can include, or be coupled to, a pressure transducer.

Figure 19:
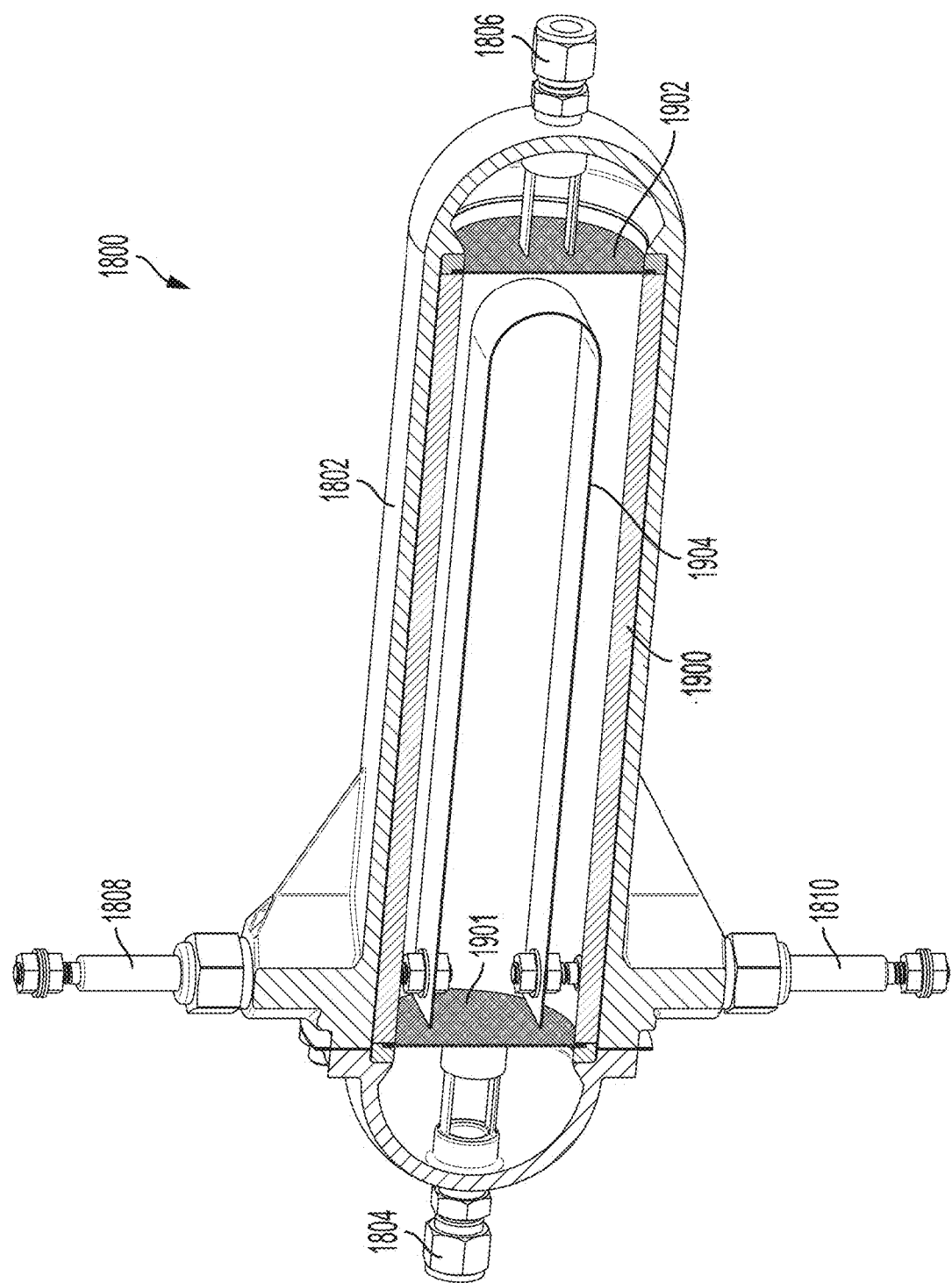
FIG. 19 is a cross-sectional view of an electric catalyst unit, according to an embodiment of the present invention.

FIG. 19 is a cross-sectional view of the electric catalyst unit 1800. In an embodiment, a ceramic tube 1900 houses a catalyst, according to an embodiment of the present invention. The ceramic tube 1900 acts as an insulator and allows heat to be focused and reflected toward the catalyst, thereby heating the catalyst.

In an embodiment, a first screen 1901 and second screen 1902 are disposed at opposite ends within the ceramic tube 1900. The screens 1901, 1902 can be made from wire, a wire mesh, or another metallic mesh or matrix structure. In an embodiment, the screens 1901, 1902 can be made from a nickel alloy that is resistant to heated hydrogen gas that is generated from the cracking of ammonia, as well as resistant to the gaseous ammonia itself.

In an embodiment, a heating element 1904 is also disposed within the ceramic tube 1900. Electrical current is passed through the heating element 1904 to heat the heating element 1904 to a threshold temperature suitable to perform the ammonia cracking process. In an embodiment, the heating element 1904 and screens 1901, 1902 are made from a nickel alloy, or other material(s) resistant to hydrogen and ammonia, as nickel maintains a fairly constant resistance with high temperatures, as opposed to steel which has a lower resistance at high temperatures. Further, nickel alloys may have a higher resistance to corrosion during exposure to ammonia and hydrogen at high temperatures (which may be realized within the electrical catalyst unit 1800, such as, for example, temperatures more than 600° C.).

In a preferred embodiment, the heating element 1904 and the screens 1901, 1902 are made from Inconel® 625. In an embodiment, the heating element 1904 and the screens 1901, 1902 can be made from the same material. Alternatively, the heating element 1904 and the screens 1901, 1902 can be made from different materials.

In an embodiment, the heating element 1904 can be an air process heater, a cartridge heater, a tubular heater, a band heater, a strip heater, an etched foil heater (or a thin-film heater), a ceramic heater, a ceramic fiber heater, a resistance wire, and the like.

In an embodiment, respective ends of the heating element 1904 are in contact with the power feed-throughs 1808, 1810. The power feed-throughs 1808, 1810 provide electricity for energizing or heating the heating element 1904.

In an embodiment, the heating element 1904 is regulated via an electronic controller coupled to the power feed-throughs 1808, 1810 by utilizing readings from the thermocouples coupled to the radial fittings 1812, so that the heating element 1904 maintains a threshold temperature suitable to perform the ammonia cracking process. The threshold temperature can range from 400° C. to 700° C., and in a preferred embodiment, the threshold temperature is at least 600° C.

In an embodiment, the electronic controller can be used to control an electric expansion valve (not depicted in FIG. 19) that is coupled to the inlet 1804 by utilizing readings from the pressure transducer coupled to radial fitting 1814 and/or the thermocouples coupled to radial fittings 1812. Once the gaseous ammonia received by the electric catalyst unit 1800 from the heat-exchange catalyst unit has reached the threshold temperature, the electric expansion valve is utilized to maintain the vapor pressure of the gaseous ammonia. At these threshold temperature and pressure values, the electric expansion valve is opened, allowing the ammonia to enter the ceramic tube 1900.

In an embodiment, catalyst, such as discrete catalyst media, is deposited into the ceramic tube. The gaseous ammonia undergoes a chemical reaction with the catalyst disposed within the ceramic tube 1900, and the resulting hydrogen gas mixture exits the electric catalyst unit 1800 via the outlet 1806 and are supplied to the downstream injection system for the engine.

In another embodiment, the heating element 1904 is coated with a catalyst that facilitates the ammonia cracking process, and discrete catalyst is not disposed within the ceramic tube 1900. In this embodiment, the catalyst is coated to the heating element 1904 using a washcoating or deposition technique to bind or adhere the catalyst to the surfaces of the heating element 1904.

In one embodiment, the heating element 1904 is a strip heater. The heating element 1904 can be coated on all surfaces with the catalyst, or alternatively, a catalyst sleeve can be placed over the strip heating element 1904. In an embodiment, the strip heating element 1904 can have a relatively low heat transfer efficiency so as to maintain a high skin (or boundary layer) temperature of the catalyst that externally coats the strip heating element 1904.

In another embodiment, the heating element 1904 is a spiral heater, a coil heater, or an air process heater, where the internal walls (which contain integral heating elements) are coated with the catalyst.

In yet another embodiment, the catalyst is coated on the interior wall(s) of the ceramic tube 1900. In this embodiment, the catalyst is coated to the interior wall(s) of the ceramic tube 1900 using a washcoating or deposition technique to bind or adhere the catalyst to the wall surfaces.

Figure 20:
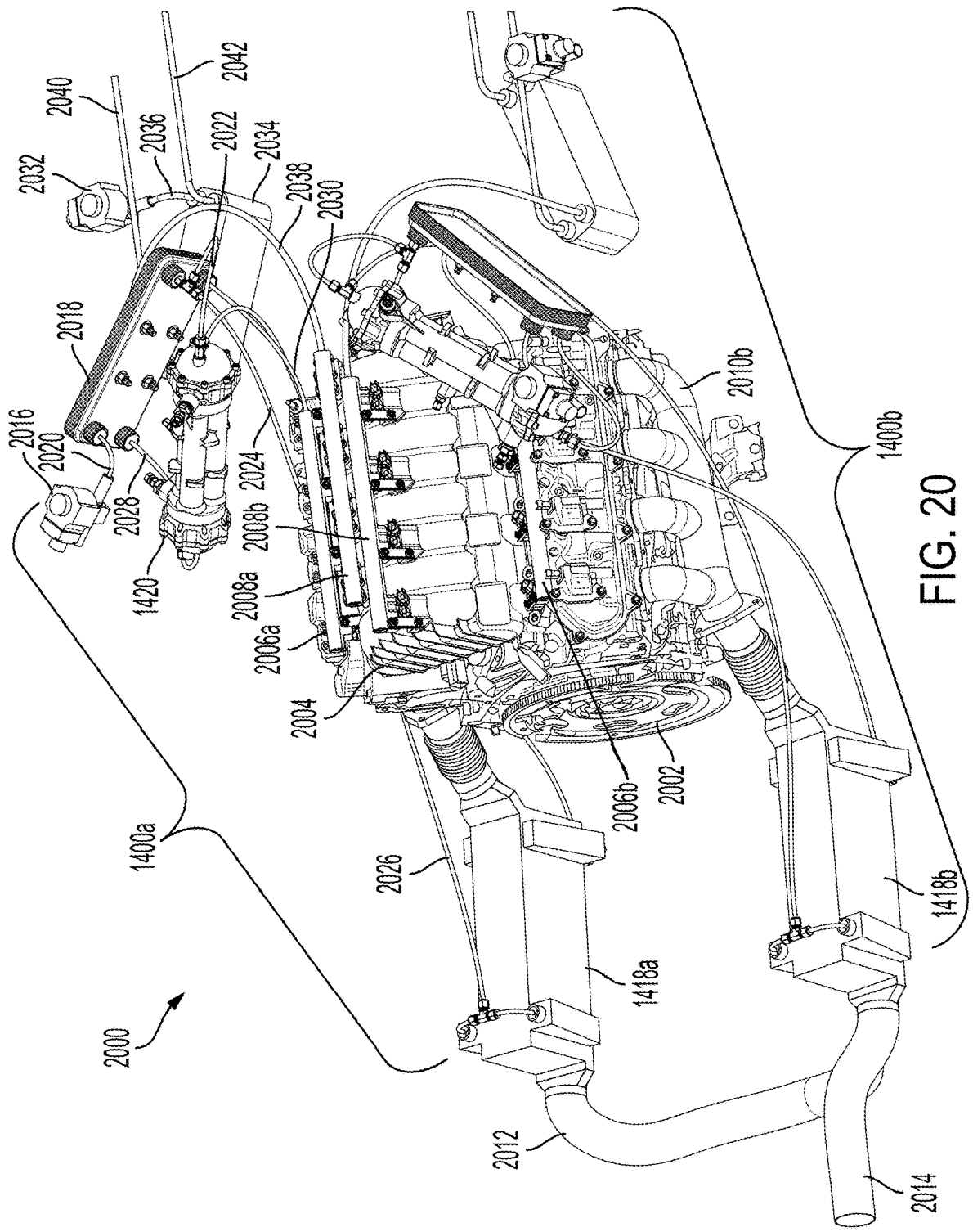
FIG. 20 is a perspective view of dual on-board ammonia cracking systems mounted within an internal combustion engine compartment of a motor vehicle, according to an embodiment of the present invention.

FIG. 20 is a perspective view of dual on-board ammonia cracking systems mounted within an internal combustion engine compartment of a motor vehicle, according to an embodiment of the present invention. In an embodiment, dual on-board cracking systems 1400a,b as described herein with respect with FIG. 14 are mounted within an engine compartment 2000 and are used to provide a hydrogen gas mixture resulting from cracking as fuel, or as a co-fuel along with ammonia, to an injection system for an eight-cylinder piston engine 2002 (hereinafter, a "V8 engine").

In an embodiment, the engine 2002 includes a left and right bank of four cylinders each which share a common crankshaft, and an intake manifold 2004 that includes left and right bank hydrogen fuel rails 2006a,b and left and right bank ammonia fuel rails 2008a,b. In embodiment, the left bank on-board cracking system 1400a supplies a hydrogen gas mixture to the left bank hydrogen fuel rail 2006a, and the right bank on-board cracking system 1400b supplies a hydrogen gas mixture to the right bank hydrogen fuel rail 2006b.

In an embodiment, the ammonia fuel rails 2008a,b are mounted to an upper portion of the intake manifold 2004 above a mounting location of the respective hydrogen fuel rails 2006a,b. In another embodiment, the mounting locations of the ammonia fuel rails 2008a,b and hydrogen fuel rails 2006a,b can be reversed, such that the hydrogen fuel rails 2006a,b are mounted to the upper portion of the intake manifold 2004 above a mounting location of the ammonia fuel rails 2008a,b.

The engine 2002 further includes left and right bank exhaust manifolds 2010a,b. Each exhaust manifold 2010a,b is coupled to a respective left and right bank heat-exchange catalyst unit 1418a,b. The exhaust manifolds 2010a,b collect exhaust gas from the multiple cylinders in the engine 2002 and allows the exhaust gas to flow to their respective heat-exchange catalyst units 1418a,b. For example, the left bank exhaust manifold 2010a collects exhaust gas generated from the left bank cylinders and channels the exhaust gas to the left bank heat-exchange catalyst unit 1418a.

In an embodiment, an outlet of the left bank heat-exchange catalyst unit 1418a is coupled via a conduit 2012 to an exhaust pipe 2014. In another embodiment, each heat-exchange catalyst unit 1418a,b has an outlet coupled to an independent exhaust pipe, and the outlets of the two heat-exchange catalyst units 1481a,b are not fluidly coupled via a conduit.

In an embodiment, each on-board cracking system 1400a,b includes an expansion valve 2016 fluidly coupled to an ammonia inlet of a plate heat-exchange unit 2018 via a supply line 2020.

An ammonia outlet of the plate heat-exchange unit 2018 is fluidly coupled to an ammonia inlet of an electric catalyst unit 1420 via a supply line 2022, and fluidly coupled to an ammonia inlet of the respective heat-exchange catalyst unit 1418 via supply line 2024.

A hydrogen inlet of the electric catalyst unit 1420 is fluidly coupled to a hydrogen outlet of the respective heat-exchange catalyst unit 1418 via supply line 2026.

A hydrogen outlet of the electric catalyst unit 1420 is fluidly coupled to a hydrogen inlet of the plate heat-exchange unit 2018 via supply line 2028.

A hydrogen outlet of the plate heat-exchange unit 2018 is fluidly coupled to the respective hydrogen fuel rail 2006 via supply line 2030.

The use of the plate heat-exchange unit 2018 is not intended to be in any way limiting, and various other types of heat-exchange units may be utilized to pre-heat the cold gaseous ammonia from the ammonia tank 1402, as well as cool the hot hydrogen gas mixture from the electric catalyst unit 1420, as described herein.

In a preferred embodiment, there is a single ammonia tank 1402 that supplies ammonia to both on-board cracking systems 1400a,b. However, in another embodiment, each on-board cracking system 1400a,b could have a separate, dedicated ammonia tank from which it receives ammonia. In this embodiment, the number of ammonia tanks would be directly correlated to the number of on-board cracking systems utilized within the engine compartment.

In an embodiment, each on-board cracking system 1400a,b further includes an expansion valve 2032 fluidly coupled to an ammonia inlet of an evaporator 2034 via supply line 2036. An ammonia outlet of the evaporator 2034 is fluidly coupled to the respective ammonia fuel rail 2008 via supply line 2038. Coolant outlets are fluidly coupled to a radiator (not shown in FIG. 20) via respective supply lines 2040, 2042.

In an embodiment, during a cold start of the engine, liquid ammonia from the tank 1402 (not shown in FIG. 20) flows to the expansion valves 2016, 2032. The expansion valves 2016, 2032 remove pressure from the liquid ammonia which allows expansion, or a state change, of the liquid ammonia into a gaseous form.

When the expansion valve 2016 is open, gaseous ammonia exits the expansion valve 2016 and flows to the plate heat-exchange unit 2018 via supply line 2020. In an embodiment, the plate heat-exchange unit 2018 pre-heats the cold gaseous ammonia before it is fed further downstream to the electric catalyst unit 1420 and/or the heat-exchange catalyst unit 1418. The cold gaseous ammonia is heated as it traverses the plate heat-exchange unit 2018 to maintain a gaseous state; if the temperature of the gaseous ammonia drops below a threshold temperature, the gaseous ammonia can change into a liquid state.

In an embodiment, the hot hydrogen gas mixture exiting the electric catalyst unit 1420 is supplied to the plate heat-exchange unit 2018 via supply line 2028. The hot hydrogen gas mixture is used to heat the plate heat-exchange unit 2018, which in turn pre-heats the gaseous ammonia as described herein. The plate heat-exchange unit 2018 provides a dual function—it cools the hot hydrogen gas mixture generated in the electric catalyst unit 1420, and also pre-heats the cold gaseous ammonia received from the ammonia tank 1402.

The plate heat-exchange unit 2018 is utilized in a preferred embodiment however, as it has a structure consisting of a series of parallel plates that allow heat-exchange via a parallel flow of the cold gaseous ammonia and the hot hydrogen gas mixture. In another embodiment, the plate heat-exchange unit 2018 can be configured such that the heat-exchange occurs via a counter-current flow of the cold gaseous ammonia and the hot hydrogen gas mixture.

In an embodiment, the plate heat-exchange unit 2018 can provide for a single-pass, or multiple passes, such as a double-pass or triple-pass, of the two gas flows.

The pre-heated gaseous ammonia flows from plate heat-exchange unit 2018 to the respective heat-exchange catalyst unit 1418 via supply line 2024. As described herein, the heat-exchange catalyst unit 1418 receives exhaust gas from the engine 2002 via the exhaust manifold 2010. If the exhaust gas has reached a threshold temperature to perform the ammonia cracking process, then the pre-heated gaseous ammonia is cracked in the heat-exchange catalyst unit 1418, and the resulting hydrogen gas mixture flows from the heat-exchange catalyst unit 1418 to the hydrogen inlet of the electric catalyst unit 1420 via supply line 2026.

In an embodiment, if the hydrogen gas mixture is flowing from the heat-exchange catalyst 1418 to the electric catalyst unit 1420, the electric catalyst unit 1420 will not perform the ammonia cracking process, and the current draw within the electric catalyst unit will be minimal or zero.

The hot hydrogen gas mixture will traverse and exit the electric catalyst unit 1420, and continue to flow to the plate heat-exchange unit 2018 via supply line 2028. The hot hydrogen gas mixture enters the plate heat-exchange unit 2018 and is cooled as it traverses through the plate heat-exchange unit 2018 as a result of a heat-exchange with the cold gaseous ammonia flowing through the plate heat-exchange unit 2018 from the ammonia tank 1402. The cooled hydrogen gas mixture then exits the plate heat-exchange unit 2018 and flows to the respective hydrogen fuel rail 2006 via supply line 2030.

In an embodiment, when the expansion valve 2032 is open, cold gaseous ammonia exits the expansion valve 2032 and flows to the evaporator 2034 via supply line 2036. The evaporator 2034 serves to pre-heat the cold gaseous ammonia, which then flows to the respective ammonia fuel rail 2008 via supply line 2038. The cold gaseous ammonia is heated as it traverses the evaporator 2034 to maintain a gaseous state; if the temperature of the gaseous ammonia drops below a threshold temperature, the gaseous ammonia can change into a liquid state. In an embodiment, coolant in the evaporator 2034 flows downstream to a radiator (not shown in FIG. 20) via supply lines 2040, 2042.

In another embodiment, other types of heating units or mechanisms can be utilized in lieu of the evaporator 2034 to pre-heat the cold gaseous ammonia from the ammonia tank 1402. For example, a supply line from the ammonia tank 1402 to the ammonia fuel rail 2008 can be coupled to an inline heater (also known as a line heater or flow-through heater), or the supply line can be wrapped or covered with a heated tubing, a coil heater, and the like. In another example, a heating unit, such as a plate heat-exchanger, a spiral heat-exchanger, a tubular heat-exchanger, a scraped surface heat-exchanger, a microwave heater, an electric heater, and the like, can be used to pre-heat the ammonia before it is supplied to the ammonia fuel rail 2008.

In yet another embodiment, the plate heat-exchange unit 2018 includes an outlet that supplies pre-heated ammonia directly to the ammonia fuel rail 2008.

In an embodiment, the ammonia flowing to the ammonia fuel rail 2008 from the evaporator 2034 and the hydrogen flowing to the hydrogen fuel rail 2006 from the plate heat-exchange unit 2018 are used as co-fuels and are supplied to the injection system within the intake manifold 2004. The injection system (not shown in FIG. 20) can include various fuel injector configurations, and in an embodiment, includes two ammonia fuel injectors and one hydrogen fuel injector for each cylinder. In another embodiment, the injection system includes one ammonia fuel injector and one hydrogen fuel injector for each cylinder. In another embodiment, the injection system includes one ammonia fuel injector and two hydrogen fuel injectors for each cylinder. In yet another embodiment, the injection system includes two ammonia fuel injectors and two hydrogen fuel injectors for each cylinder.

The injection system configuration described herein is not intended to be in any way limiting, and the number of fuel injectors for each cylinder can be varied based on the power and efficiency requirements of the specific engine utilized, as well as the type of engine being implemented with the on-board ammonia cracking system 1400.

For example, the number of fuel injectors for each cylinder can be based on (i) the flow rate of the specific injector type utilized and/or (ii) the engine size, such that the appropriate volume of the hydrogen gas mixture can be administered into each cylinder. If the engine size and the corresponding power output of the engine is relatively small, then a smaller amount of the hydrogen gas mixture is required for each cylinder, compared to a larger engine having a larger power output. Thus, a smaller number of fuel injectors could potentially be utilized for a smaller engine compared to a larger engine. For example, for an engine having twelve or more cylinders, three or more on-board ammonia cracking systems could potentially be utilized.

In an embodiment, the injection system can utilize port injection, direct injection, or a combination of both, for each cylinder, to deliver the hydrogen and ammonia co-fuels.

It is noted however, that while engine 2002 depicted in FIGS. 20-23 is a V8 engine, this description is an illustrative example only and is not intended to be in any way limiting.

For example, engine 2002 can be a V-engine or a straight-engine (i.e., inline engine) having any number of cylinders, such as two cylinders up to twenty-four cylinders. The number of on-board ammonia cracking systems 1400 utilized within the engine compartment 2000 is a function of the number of cylinders and cylinder banks in the engine 2002. For example, for a V4 engine, a single on-board ammonia cracking system 1400 can be utilized to supply a hydrogen gas mixture as fuel, or co-fuel along with ammonia, to each cylinder bank each within the intake manifold 2004.

In an embodiment, both on-board ammonia cracking systems 1400a,b operate in parallel with each other. In another embodiment, the electronic controller and/or vehicle ECU can selectively deactivate one of the on-board cracking systems based on sensor readings related to the throughput of the hydrogen gas mixture, pressure, temperature, flow rates, cracking efficiency, and the like, to optimize the flow rate of the hydrogen fed to the injection system.

Figure 21:
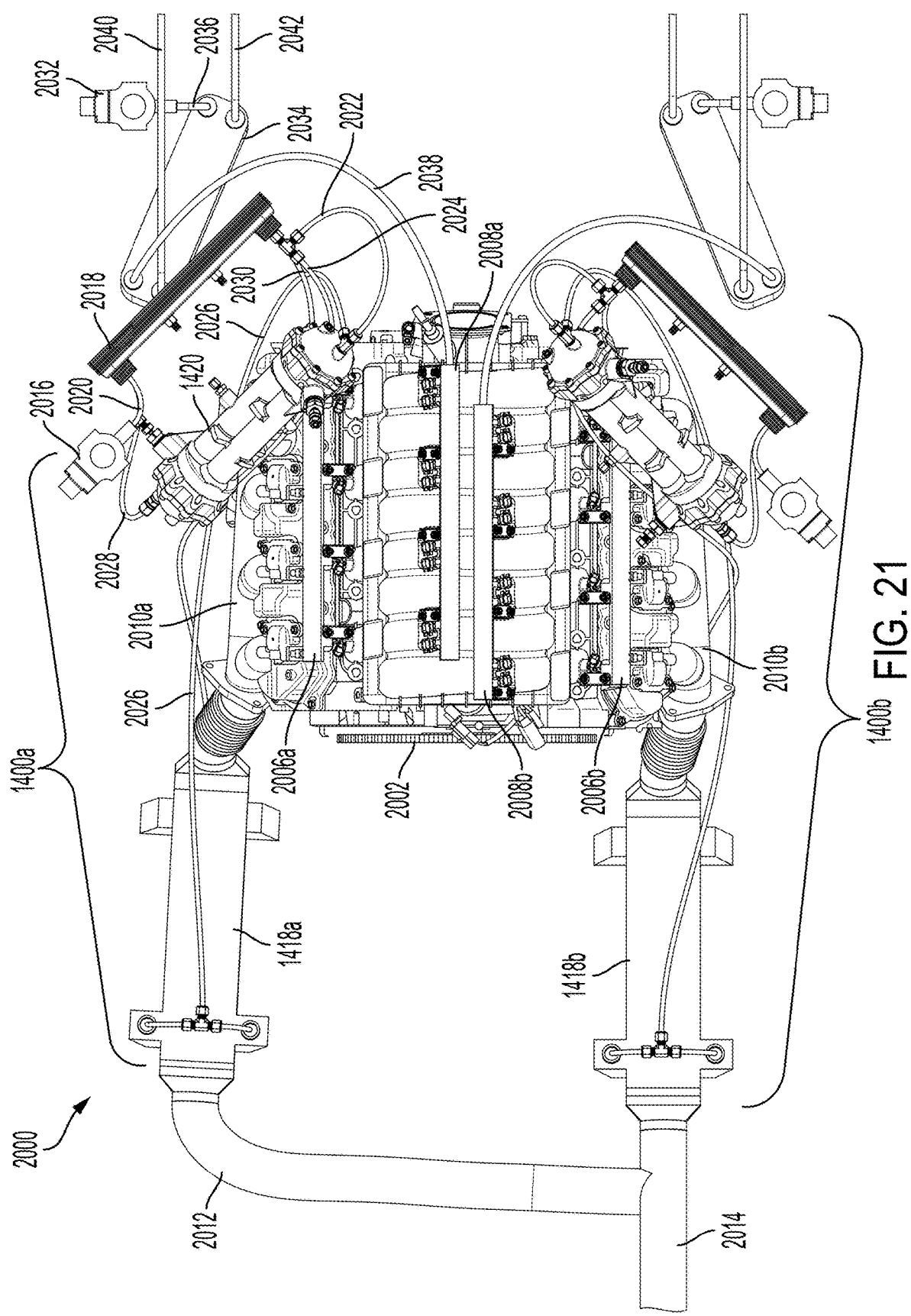
FIG. 21 is a top-down view of dual on-board ammonia cracking systems mounted within an internal combustion engine compartment of a motor vehicle, according to an embodiment of the present invention.

FIG. 21 is a top-down view of dual on-board ammonia cracking systems 1400a,b mounted within the internal combustion engine compartment 2000 depicted in FIG. 20, according to an embodiment of the present invention.

Figure 22:
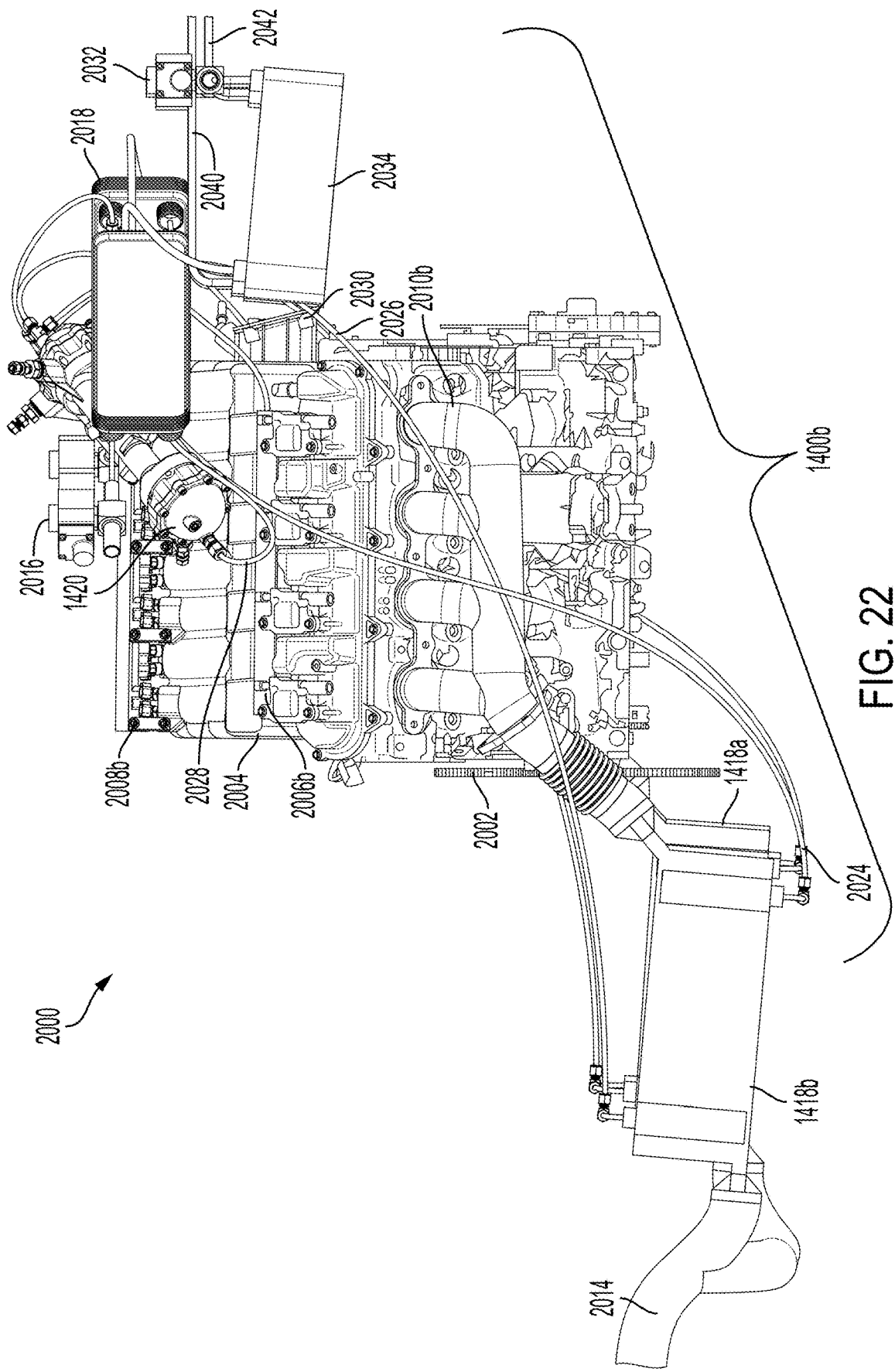
FIG. 22 is a side view of dual on-board ammonia cracking systems mounted within an internal combustion engine compartment of a motor vehicle, according to an embodiment of the present invention.

FIG. 22 is a side view of dual on-board ammonia cracking systems 1400a,b mounted within the internal combustion engine compartment 2000 depicted in FIG. 20, according to an embodiment of the present invention. The right bank on-board ammonia cracking system 1400b is prominently shown in FIG. 22.

Figure 23:
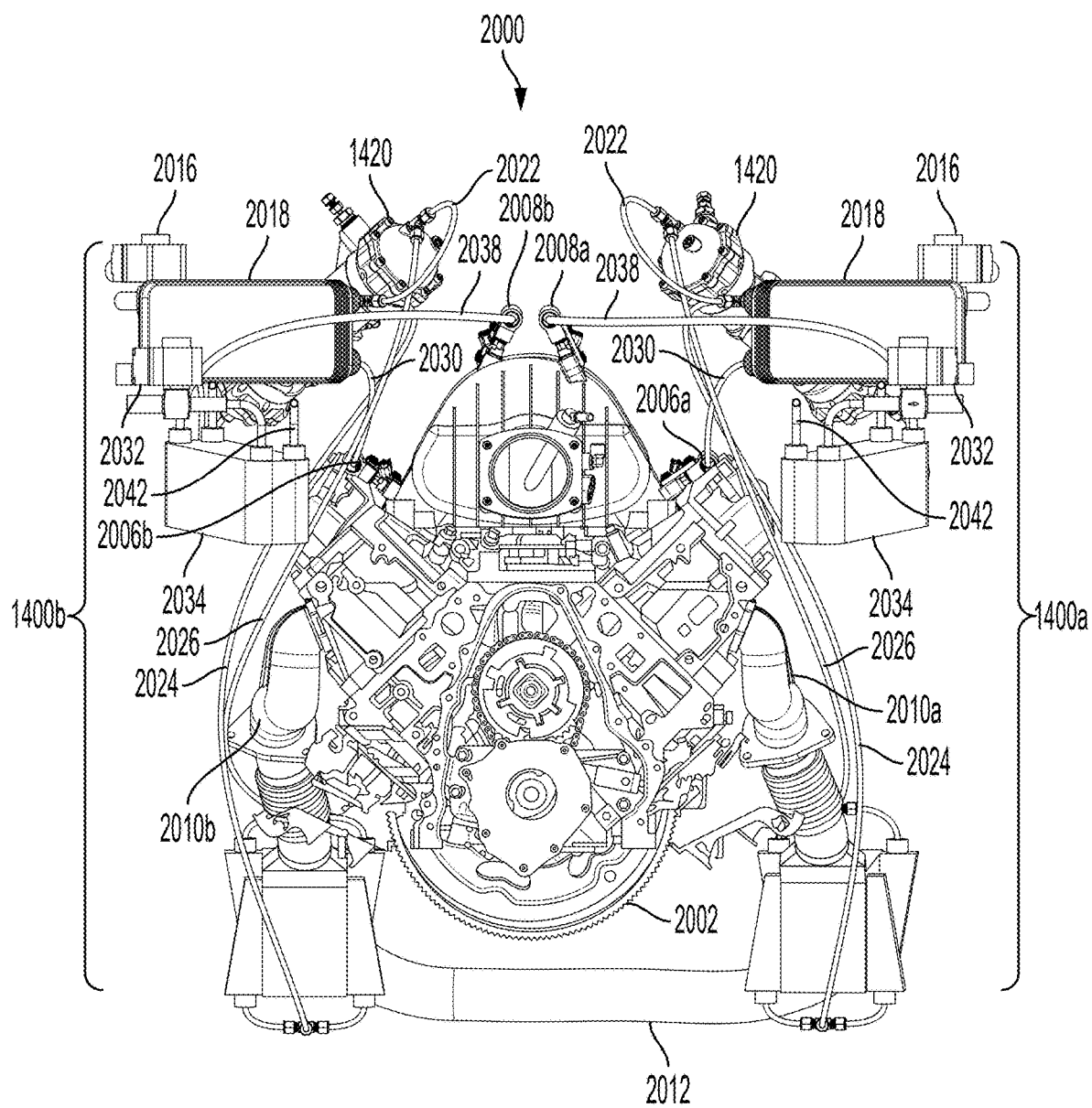
FIG. 23 is a front view of dual on-board ammonia cracking systems mounted within an internal combustion engine compartment of a motor vehicle, according to an embodiment of the present invention.

FIG. 23 is a front view of dual on-board ammonia cracking systems 1400a,b mounted within the internal combustion engine compartment 2000 depicted in FIG. 20, according to an embodiment of the present invention.

Figure 24:
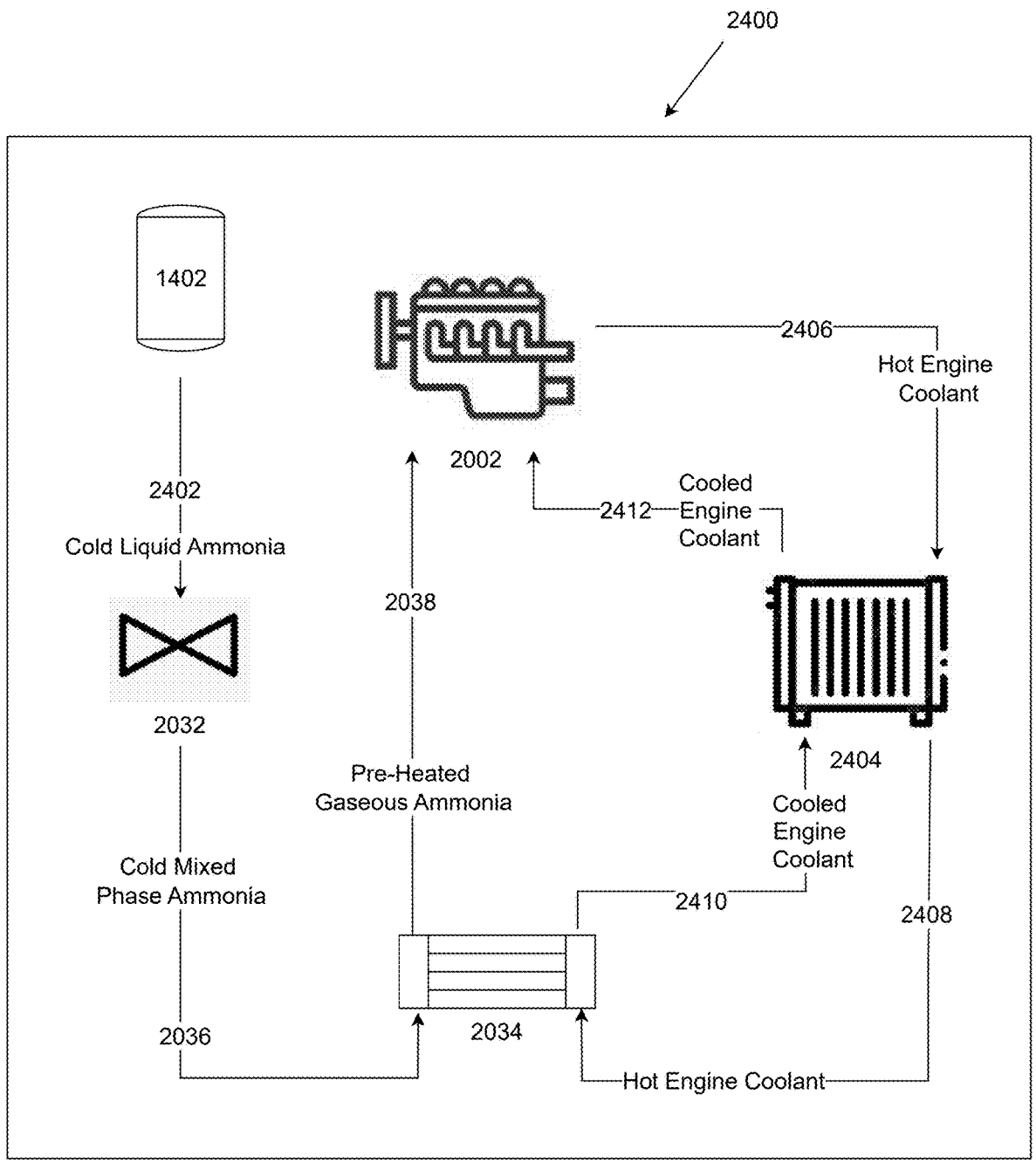
FIG. 24 is a block diagram of an engine cooling system having a radiator, and which utilizes ammonia as a heat-exchange medium, according to an embodiment of the present invention.

FIG. 24 is a block diagram of an engine cooling system 2400 having a radiator 2404, and which utilizes ammonia as a heat-exchange medium, according to an embodiment of the present invention. In an embodiment, the evaporator 2034 vaporizes liquid ammonia, and supplies resulting gaseous ammonia to the ammonia fuel rail 2008 of the engine 2002. The evaporator 2034 also serves as a heat-exchange unit between cold ammonia received from the liquid ammonia tank 1402 and hot engine coolant output from the engine 2002.

In an embodiment, cold liquid ammonia flows from the liquid ammonia tank 1402 to the expansion valve 2032 via supply line 2402. The expansion valve 2032 removes pressure from the cold liquid ammonia, resulting in a cold mixed phase (i.e., liquid and gas) ammonia. The cold mixed phase ammonia flows from the expansion valve 2032 to the evaporator 2034 via supply line 2036.

In an embodiment, the radiator 2404 receives hot coolant from the engine 2002 via supply line 2406. The hot engine coolant flows from the radiator 2404 to the evaporator 2034 via supply line 2408.

In an embodiment, the evaporator 2034 is in the form of a plate heat-exchange unit with a structure consisting of a series of parallel plates that allow heat-exchange via a parallel flow of the cold ammonia and the hot engine coolant. In another embodiment, the evaporator 2034 can be configured such that the heat-exchange occurs via a counter-current flow of the cold ammonia and the hot engine coolant.

In an embodiment, the evaporator 2034 can provide for a single-pass or multiple passes (i.e., double-passes or triple-passes) of the ammonia and coolant flows.

As the hot engine coolant and the cold ammonia traverse the evaporator 2034, heat is transferred from the hot engine coolant to the cold ammonia, thereby cooling the engine coolant.

As heat is transferred from the engine coolant to the cold mixed phase ammonia, the cold mixed phase ammonia is heated and vaporizes into gaseous ammonia. The resulting gaseous ammonia continues to be pre-heated due to the continuous transfer of heat from the engine coolant as both fluids traverse the evaporator 2034, thereby maintaining the ammonia in a gaseous state. If the temperature of the gaseous ammonia drops below a threshold temperature, the gaseous ammonia can change into a liquid state.

The cooled engine coolant is supplied back to the radiator 2404 via supply line 2410, while the pre-heated gaseous ammonia is supplied to the ammonia fuel rail 2008 via supply line 2038, and subsequently supplied the injection system within the intake manifold 2004 of the engine 2002.

Furthermore, the cooled engine coolant is supplied to the engine 2002 from the radiator 2404 via supply line 2412. The cooled engine coolant is heated as it transfers heat from the components of the engine 2002. The hot engine coolant flows back to the radiator 2404 via supply line 2406, and subsequently flows to the evaporator 2034 via supply line 2408, where the heat-exchange process described herein repeats.

Thus, the on-board ammonia cracking system 1400 not only utilizes ammonia as a co-fuel along with the hydrogen that is supplied to the engine 2002 (i.e., the pre-heated gaseous ammonia via supply line 2038), but also utilizes ammonia as a heat-exchange medium to transfer heat from the hot engine coolant.

As such, the radiator 2404 of the present invention can have a smaller size, weight, and footprint than a conventional radiator. A smaller radiator can allow for a smaller grille footprint (i.e., a smaller sized and/or dimensioned grille or air intake opening), which can streamline the front portion of the vehicle. A streamlined front portion can improve the aesthetic appearance as well as improve aerodynamics of the vehicle.

Figure 25:
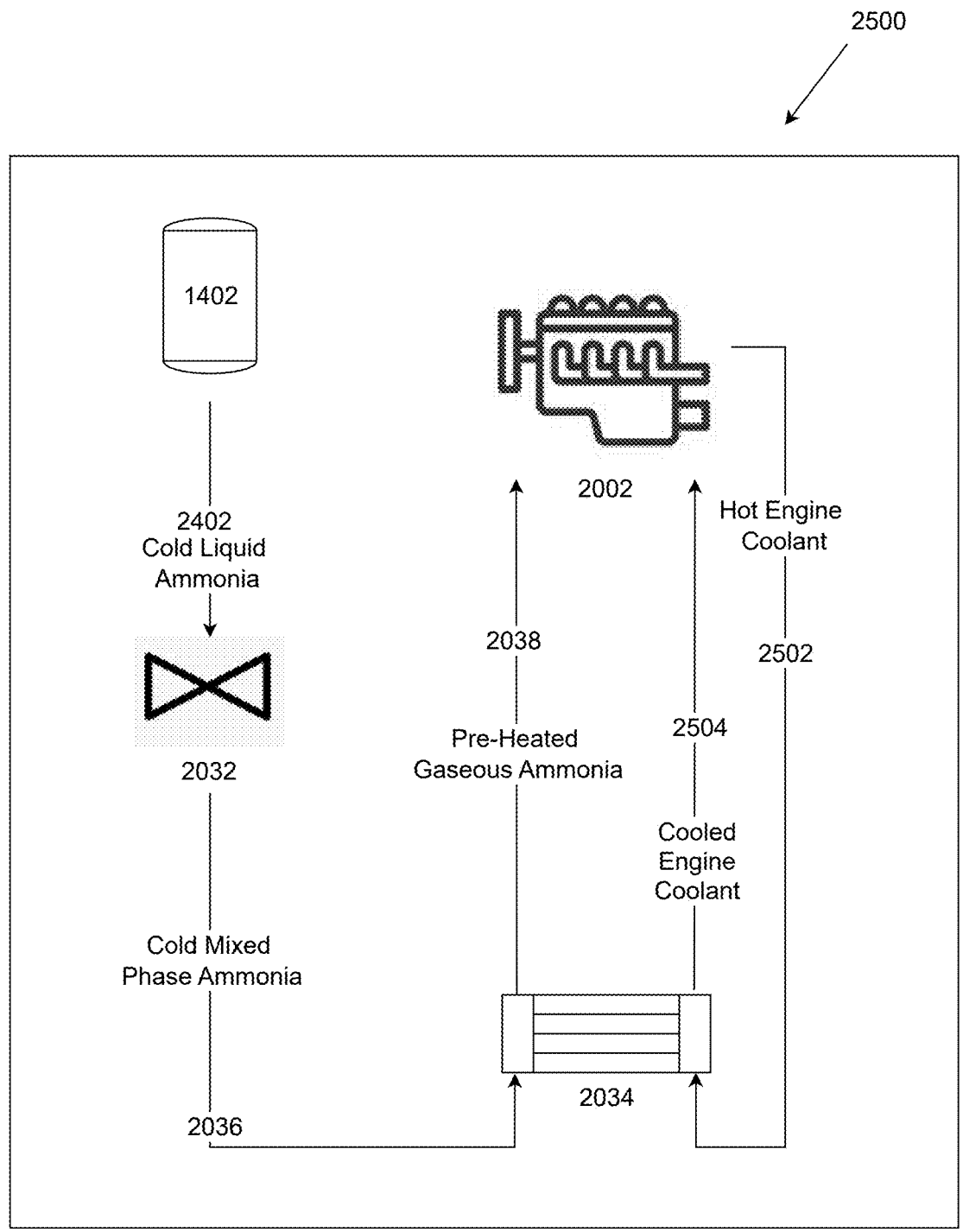
FIG. 25 is a block diagram of an engine cooling system without a radiator, and which utilizes ammonia as a heat-exchange medium, according to an embodiment of the present invention.

In another embodiment, shown in FIG. 25, the radiator 2404 shown in FIG. 24 is not required. Hot engine coolant flows to the evaporator 2034 from the engine 2002 via supply line 2502, where it is cooled as described herein. The cooled engine coolant is supplied back to the engine 2002 via supply line 2504, where heat from the components of the engine 2002 is transferred to the engine coolant.

Eliminating the radiator 2404 allows the front portion of the vehicle to not have a grille or air intake opening, allowing for a streamlined front portion that can improve that aesthetic appearance as well as improve aerodynamics of the vehicle.

For example, the front portion of the vehicle of the present invention can more easily accommodate an air dam and/or splitter, as the usable surface area of the front portion is increased with a smaller grille footprint or elimination of the grille. Air dams and splitters, for example, modify the flow of air passing under the vehicle body to balance the distribution of fore and aft downforce. An air dam is a fluid barrier structure mounted underneath or integrated with the front-end bumper structure of the vehicle, extending downward into proximity with the roadway. Air dams, also known as front spoilers, enhance vehicle aerodynamics and stability by blocking and redirecting the flow of turbulent air flowing under the vehicle chassis. Splitters, on the other hand, are a flat extension to the bottom of the front bumper, extending forward and parallel to the ground. A splitter acts as a wedge that forces high pressure air upwards and over the vehicle, and forces high-speed, low-pressure air underneath the car, resulting in a net positive downforce.

Aerodynamic improvements to the front portion of the vehicle resulting from a smaller grille footprint, or elimination of the grille, can improve performance and efficiency in several ways:
1. Improved fuel efficiency—Reducing drag on a vehicle requires less power from the engine, which improves fuel economy. On average, aerodynamics can improve fuel economy by 0.1-0.3 miles per gallon.
2. Increased top speed—With less drag, a vehicle can reach higher top speeds.
3. Improved handling and stability—Managing lift forces can improve a vehicle's handling and stability, especially when dealing with side winds.
4. Improved tire grip—Aerodynamic downforce can increase tire grip without adding weight to the vehicle.
5. Reduced noise—Aerodynamics can help minimize wind noise and other noise emissions.

Figure 26:
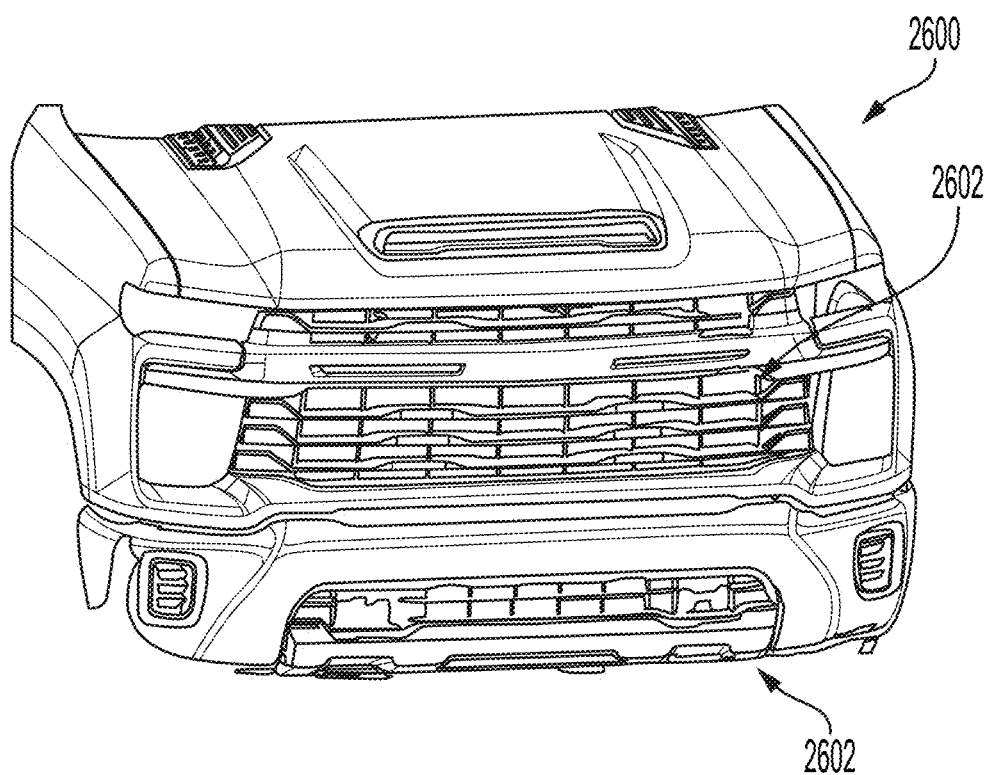
FIG. 26 is a perspective view of a vehicle front portion having a grille, according to an embodiment of the present invention.

FIG. 26 is a perspective view of a vehicle front portion 2600 having a grille 2602, according to an embodiment of the present invention. The grille 2602 can have upper and lower grille members. In another embodiment, the grille 2602 can include only a single grille member. While a pick-up truck is depicted in FIG. 26, the vehicle can be any type of motor vehicle, such as, for example, a passenger car, a sport-utility vehicle, a sedan, a coupe, a heavy-duty truck, a van, a ship, an airplane, and the like.

Figure 27:
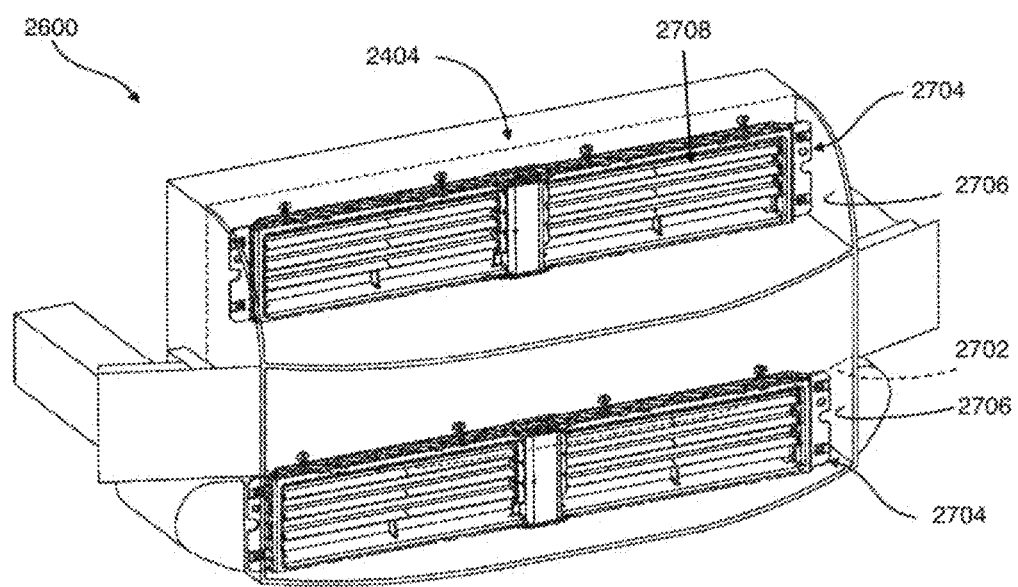
FIG. 27 is a perspective view of a louver system for the grille, according to an embodiment of the present invention.

FIG. 27 is a perspective view of a louver system 2704 for the grille 2602, according to an embodiment of the present invention. The vehicle front portion 2600 includes the radiator 2404 mounted to a frame member 2702 adjacent to an engine compartment. The frame member 2702 has upper and lower grille openings 2706 (corresponding to the upper and lower grille members shown in FIG. 26) which provides ambient cooling airflow to the radiator 2404.

In an embodiment, a separate louver system 2704 is mounted within each grille opening 2706. The louver systems 2704 regulate the cooling airflow to the radiator 2404. The louver system 2704 includes a series of individual louvers 2708 which can be controlled to rotate or swivel in order to adjust the amount and/or rate of cooling airflow provided to the radiator 2404. For example, the louvers 2708 can be closed to block cooling airflow from reaching the radiator 2404, can be fully opened to maximize cooling airflow provided to the radiator 2404, or can be partially opened to limit the cooling airflow provided to the radiator 2404.

In an embodiment, the louver system 2704 can be controlled by the ECU, and can be automatically adjusted based on sensed temperature from the engine 2002 and/or engine components. For example, if the engine temperature is above an optimal operating range, the louvers 2708 can be opened to allow more cooling airflow to the radiator 2404 to facilitate engine cooling. However, if the engine temperature is below the optimal operating range, the louvers 2708 can be closed to limit or block the cooling airflow, as the heat-exchange occurring in the evaporator 2034 is providing sufficient cooled engine coolant to the engine 2002 to maintain an optimal operating temperature.

Conversely, in a cold ambient environment, or a cold start of the engine 2002, the engine temperature may need to be raised to an optimal operating range. When the engine 2002 is initially started and is substantially the same temperature as the ambient environment, the engine 2002 is the least fuel efficient (especially when the temperature of the ambient environment is cold). This reduced fuel efficiency is why it is desirable to bring the engine temperature up to the optimal operating temperature relatively quickly. In this scenario, if the engine temperature is below the optimal operating range, the louvers 2708 can be closed to limit or block the cooling airflow in order to facilitate heating of the engine 2002.

In an embodiment, the upper and lower louver systems 2704 can be independently controlled, such that the louvers 2708 of only one of the louver systems 2704 is actuated.

In another embodiment, the vehicle operator can manually actuate or control the louvers 2708 as desired, such as to manually take advantage of a cold air intake turbocharger.

Figure 28:
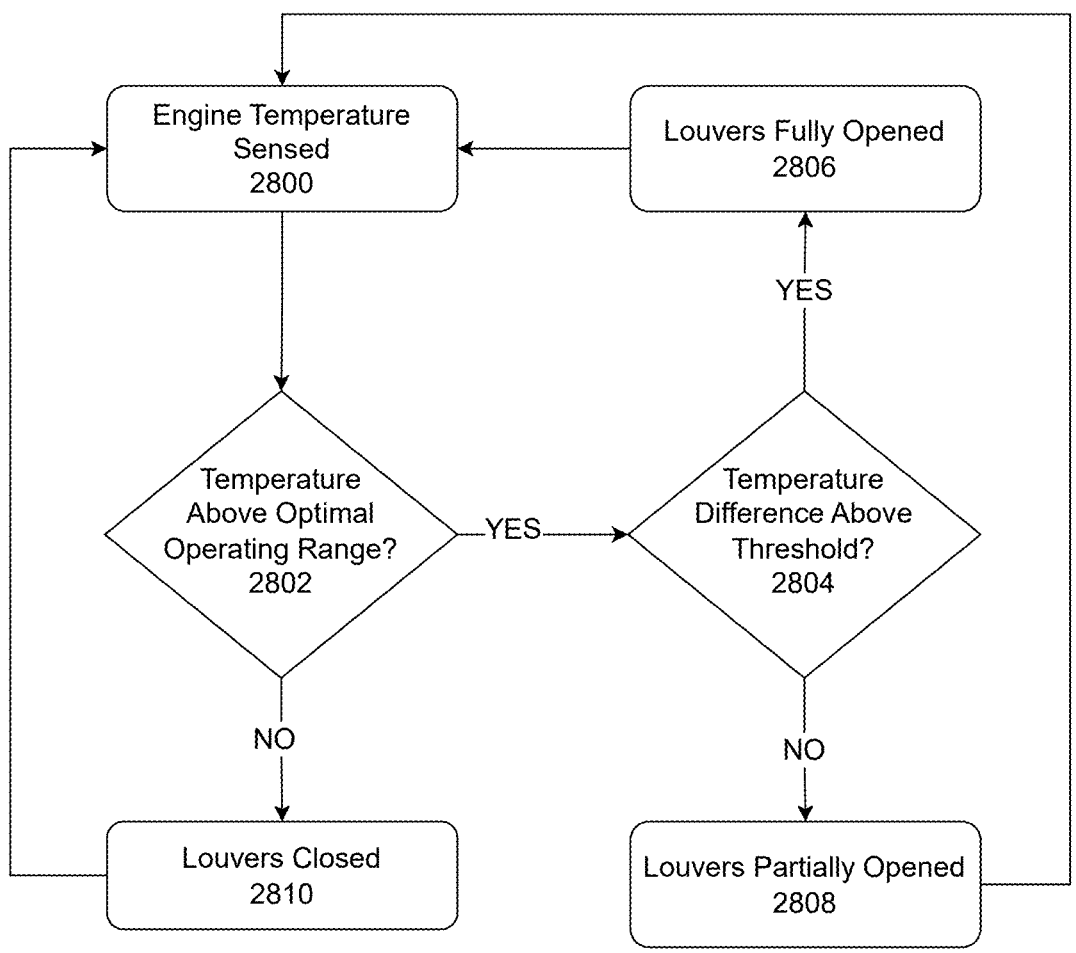
FIG. 28 is a flowchart depicting the steps of actuating the louvers based on a sensed engine temperature, according to an embodiment of the present invention.

FIG. 28 is a flowchart depicting the steps of actuating the louvers 2708 based on a sensed engine temperature, according to an embodiment of the present invention. At step 2800, the temperature of the engine 2002 is detected by a temperature sensor. At step 2802, the ECU determines if the sensed engine temperature is above the optimal operating range. In an embodiment, the optimal operating range for the engine 2002 is between 87-107° C. (190-225° F.).

If the sensed engine temperature is above the optimal operating range, the ECU determines a difference between the sensed engine temperature and maximum optimal operating range at step 2804. If the difference is above a threshold value, the ECU controls the louvers 2708 to fully open at step 2806 in order to maximize the amount of cooling airflow provided to the radiator 2404. This in turn allows the radiator 2404 to assist the cooling system 2400 to bring the engine temperature down to within the optimal operating range.

If the difference is below the threshold value, the ECU controls the louvers 2708 to partially open at step 2808, thereby mitigating aerodynamic drag on the vehicle, while at the same time providing sufficient cooling airflow to the radiator 2404. Again, this in turn allows the radiator 2404 to assist the cooling system 2400 to bring the engine temperature down to within the optimal operating range.

In an embodiment, the threshold value can be a fixed value or a percentage. For example, the threshold value can be a temperature 10° above the maximum optimal operating range or can be a temperature 10% above the maximum optimal operating range. It is noted, however, that these threshold values are illustrative examples only and are not intended to be in any way limiting.

After the louvers 2708 are opened either fully at step 2806 or partially at step 2808, the process continues back to step 2800 where the engine temperature is sensed again.

If, however, at step 2802 the sensed engine temperature is not above the optimal operating range, then the process continues to step 2810 where the louvers 2810 are closed or remain closed if they had not previously been opened. The process continues back to step 2800 where the engine temperature is sensed again.

Figure 29:
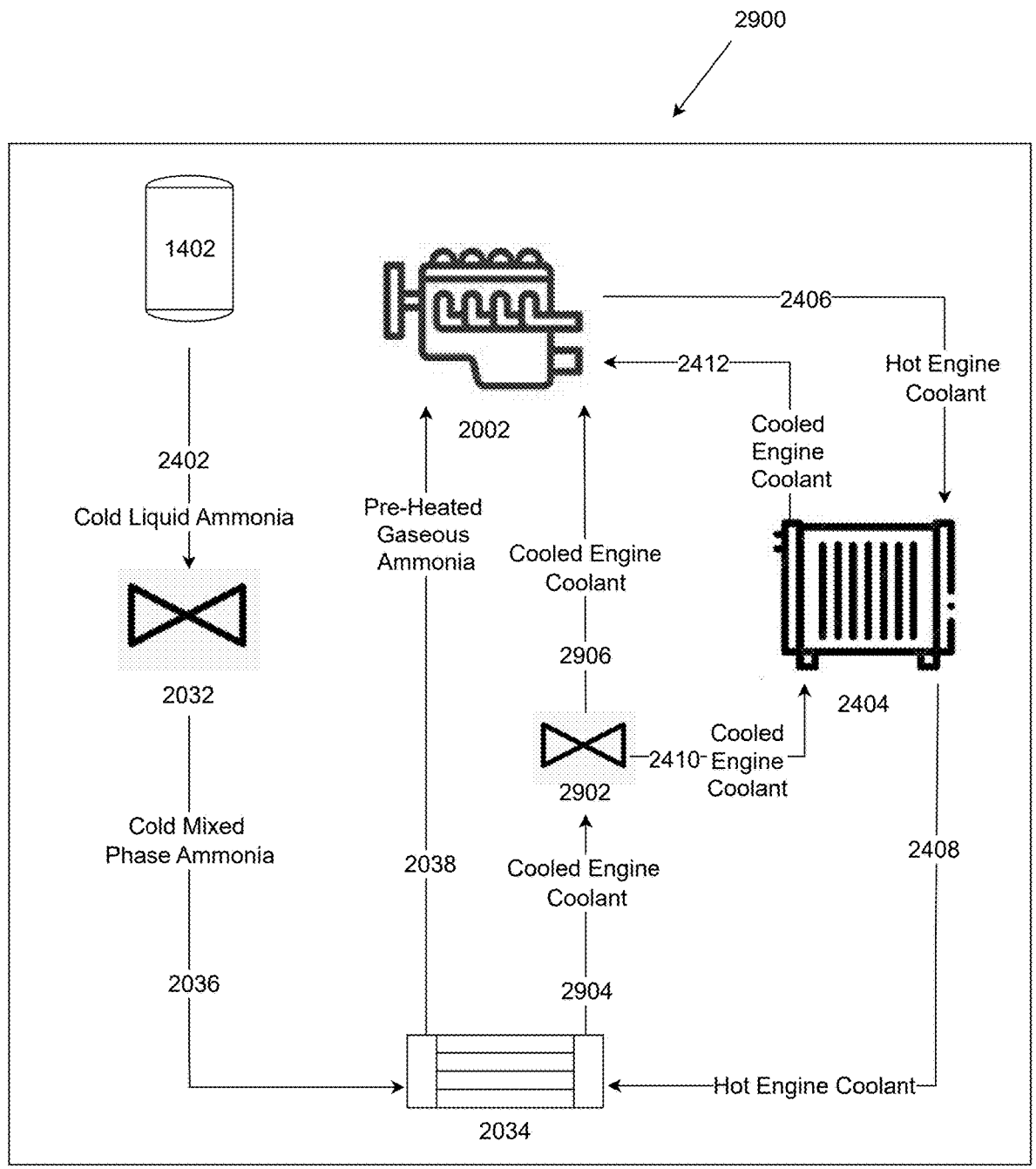
FIG. 29 is a block diagram of an engine cooling system having a radiator with a bypass valve, and which utilizes ammonia as a heat-exchange medium, according to an embodiment of the present invention.

FIG. 29 is a block diagram of an engine cooling system 2900 having a radiator 2404 with a bypass valve 2902, and which utilizes ammonia as a heat-exchange medium, according to an embodiment of the present invention. The engine cooling system 2900 is identical to the engine cooling system depicted in FIG. 25, however, the bypass valve 2902 is coupled between the evaporator 2034, the radiator 2404, and the engine 2002. The ECU can control the bypass valve 2902 based on the temperature of the engine 2002. For example, if the temperature of the engine 2002 is above the optimal operating range, the bypass valve 2902 can be closed such that cooled engine coolant flows from the evaporator 2034 via supply line 2904 and to the radiator 2404 via supply line 2410.

However, if the temperature of the engine 2002 is below the optimal operating range, the bypass valve 2902 can be opened such that the cooled engine coolant flows from the evaporator 2034 via supply line 2904 and to the engine 2002 via supply line 2906.

The bypass valve 2902 allows the vehicle to utilize supplemental cooling from the radiator 2404 as needed if the engine temperature rises above the optimal operating range.

Figure 30:
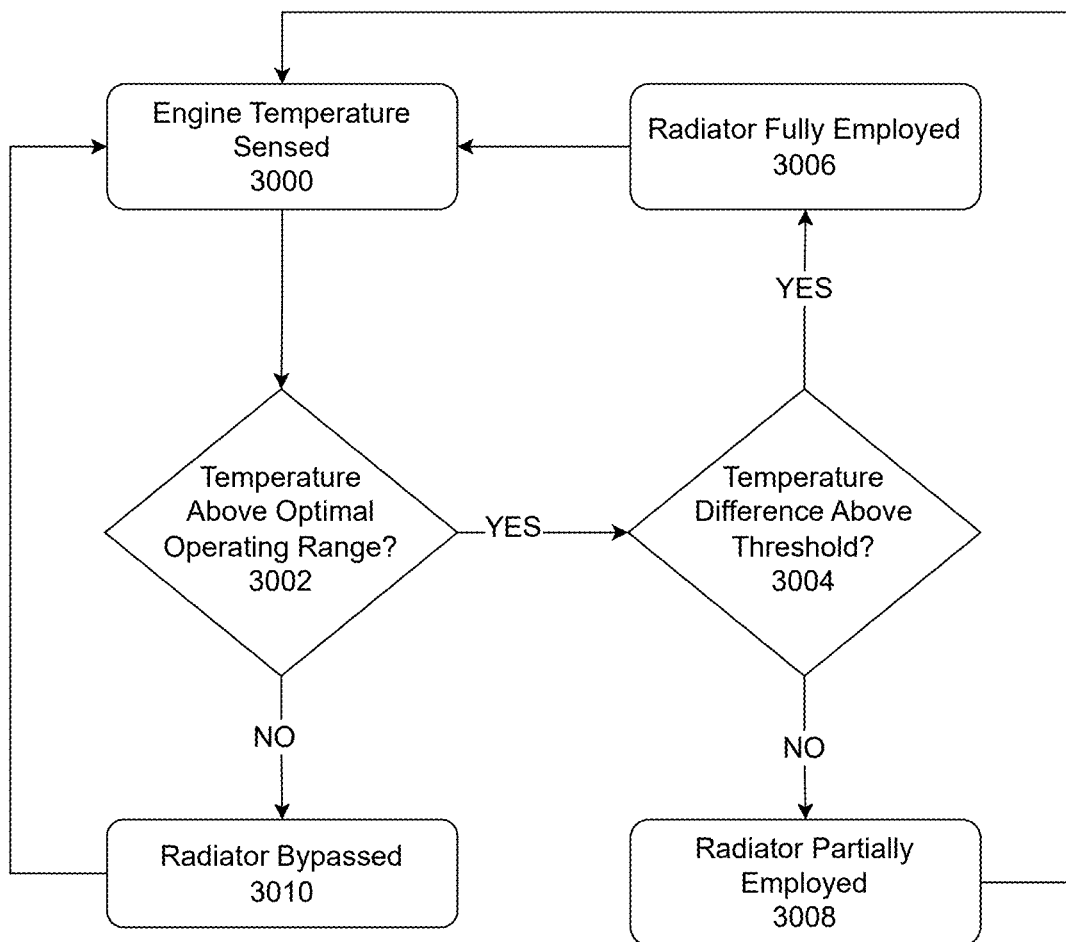
FIG. 30 is a flowchart depicting the steps of bypassing the radiator based on a sensed engine temperature, according to an embodiment of the present invention.

FIG. 30 is a flowchart depicting the steps of bypassing the radiator 2404 based on a sensed engine temperature, according to an embodiment of the present invention. At step 3000, the temperature of the engine 2002 is detected by a temperature sensor. At step 3002, the ECU determines if the sensed engine temperature is above the optimal operating range. In an embodiment, the optimal operating range for the engine 2002 is between 87-107° C. (190-225° F.).

If the sensed engine temperature is above the optimal operating range, the ECU determines a difference between the sensed engine temperature and maximum optimal operating range at step 3004. If the difference is above a threshold value, the ECU controls the bypass valve 2902 to be fully closed, allowing a maximum amount of cooled engine coolant to flow from the evaporator 2034 to the radiator 2404. This in turn allows the radiator 2404 to assist the cooling system 2400 to bring the engine temperature down to within the optimal operating range.

If the difference is below the threshold value, the ECU controls the bypass valve 2902 to partially close at step 3008, thereby reducing power consumption of a coolant pump (not shown in the figures), while at the same time allowing the radiator 2404 to assist the cooling system 2900 to bring the engine temperature down to within the optimal operating range.

In an embodiment, the threshold value can be a fixed value or a percentage. For example, the threshold value can be a temperature 10° above the maximum optimal operating range or can be a temperature 10% above the maximum optimal operating range. It is noted, however, that these threshold values are illustrative examples only and are not intended to be in any way limiting.

After the bypass valve 2902 is closed either fully at step 3006 or partially at step 3008, the process continues back to step 3000 where the engine temperature is sensed again.

If, however, at step 3002 the sensed engine temperature is not above the optimal operating range, then the process continues to step 3010 where the bypass valve 3020 is fully opened or remains fully open if it had not previously been opened. The process continues back to step 3000 where the engine temperature is sensed again.

When the bypass valve 2902 is fully or partially opened, the total flow rate of coolant through the radiator 2404 can be reduced, thus reducing the amount of power needed for the coolant pump, which can improve fuel efficiency of the vehicle.

The remaining figures have been provided to show additional details and embodiments of the on-board ammonia cracking system.

While the principles of the disclosure have been illustrated in relation to the exemplary embodiments shown herein, the principles of the present invention are not limited thereto and include any modification, variation, or permutation thereof.

The invention claimed is:

1. A system for heat-exchange between ammonia and engine coolant for an internal combustion engine, comprising:
   an electronic control unit (ECU);
   an ammonia tank containing ammonia;
   a heat-exchange unit fluidly coupled to the ammonia tank and to the internal combustion engine, the heat-exchange unit receiving ammonia from the ammonia tank;
   a radiator fluidly coupled to the heat-exchange unit and to the internal combustion engine, the radiator receiving hot engine coolant from the internal combustion engine, and the radiator supplying the hot engine coolant to the heat-exchange unit;
   a temperature sensor coupled to the ECU to detect a temperature of the internal combustion engine; and
   at least one louver coupled to the ECU, the louver configured to be in an open state and a closed state,
   wherein the ECU adjusts the louver to the open state when a difference between the temperature of the internal combustion engine and an optimal operating temperature is above a threshold value, thereby maximizing ambient airflow to the radiator to facilitate cooling of the hot engine coolant,
   wherein the ECU adjusts the louver to the closed state when the temperature of the internal combustion engine is below the optimal operating temperature, thereby blocking ambient airflow to the radiator,
   wherein heat is transferred from the hot engine coolant to the ammonia within the heat-exchange unit, resulting in heated ammonia and cooled engine coolant,
   wherein the heated ammonia exits the heat-exchange unit and is supplied to the internal combustion engine, and
   wherein the cooled engine coolant exits the heat-exchange unit and is supplied to the radiator.

2. The system of claim 1, wherein the heated ammonia is supplied to the internal combustion engine for use as a combustion fuel.

3. The system of claim 1, wherein the heated ammonia is supplied to the internal combustion engine for use as a combustion co-fuel along with hydrogen.

4. The system of claim 1, wherein the heat-exchange unit is an evaporator.

5. The system of claim 1, wherein the optimal operating temperature has a range between 87° C.-107° C.

6. The system of claim 1, further comprising an expansion valve fluidly coupled between the ammonia tank and the heat-exchange unit.

7. The system of claim 1, wherein the internal combustion engine utilizes as combustion co-fuels only (i) the heated ammonia and (ii) hydrogen generated from the ammonia stored in the ammonia tank.

8. A system for heat-exchange between ammonia and engine coolant for an internal combustion engine, comprising:
   an electronic control unit (ECU);
   an ammonia tank containing ammonia;
   a heat-exchange unit fluidly coupled to the ammonia tank and to the internal combustion engine, the heat-exchange unit receiving ammonia from the ammonia tank;
   a radiator fluidly coupled to the heat-exchange unit and to the internal combustion engine, the radiator receiving hot engine coolant from the internal combustion engine, and the radiator supplying the hot engine coolant to the heat-exchange unit;
   a temperature sensor coupled to the ECU to detect a temperature of the internal combustion engine; and
   at least one louver coupled to the ECU, the louver configured to be in an open state and a partially open state, wherein the ECU adjusts the louver to the open state when a difference between the temperature of the internal combustion engine and an optimal operating temperature is above a threshold value, thereby maximizing ambient airflow to the radiator to facilitate cooling of the hot engine coolant, wherein the ECU adjusts the louver to the partially open state when the difference between the temperature of the internal combustion engine and the optimal operating temperature is below the threshold value, thereby reducing ambient airflow to the radiator, wherein heat is transferred from the hot engine coolant to the ammonia within the heat-exchange unit, resulting in heated ammonia and cooled engine coolant, wherein the heated ammonia exits the heat-exchange unit and is supplied to the internal combustion engine, and wherein the cooled engine coolant exits the heat-exchange unit and is supplied to the radiator.

9. The system of claim 8, wherein the heated ammonia is supplied to the internal combustion engine for use as a combustion fuel.

10. The system of claim 8, wherein the heated ammonia is supplied to the internal combustion engine for use as a combustion co-fuel along with hydrogen.

11. The system of claim 8, wherein the heat-exchange unit is an evaporator.

12. The system of claim 8, wherein the optimal operating temperature has a range between 87° C.-107° C.

13. The system of claim 8, further comprising an expansion valve fluidly coupled between the ammonia tank and the heat-exchange unit.

14. The system of claim 8, wherein the internal combustion engine utilizes as combustion co-fuels only (i) the heated ammonia and (ii) hydrogen generated from the ammonia stored in the ammonia tank.

15. A system for heat-exchange between ammonia and engine coolant for an internal combustion engine, comprising:
an electronic control unit (ECU);
an ammonia tank containing ammonia;
a heat-exchange unit fluidly coupled to the ammonia tank and to the internal combustion engine, the heat-exchange unit receiving ammonia from the ammonia tank;
a radiator fluidly coupled to the heat-exchange unit and to the internal combustion engine, the radiator receiving hot engine coolant from the internal combustion engine, and the radiator supplying the hot engine coolant to the heat-exchange unit;
a temperature sensor coupled to the ECU to detect a temperature of the internal combustion engine; and
at least one louver coupled to the ECU, the louver configured to be in an open state, a closed state, and a partially open state, wherein the ECU adjusts the louver to the open state when a difference between the temperature of the internal combustion engine and an optimal operating temperature is above a threshold value, thereby maximizing ambient airflow to the radiator to facilitate cooling of the hot engine coolant, wherein the ECU adjusts the louver to the closed state when the temperature of the internal combustion engine is below the optimal operating temperature, thereby blocking ambient airflow to the radiator, wherein the ECU adjusts the louver to the partially open state when the difference between the temperature of the internal combustion engine and the optimal operating temperature is below the threshold value, thereby reducing ambient airflow to the radiator, wherein heat is transferred from the hot engine coolant to the ammonia within the heat-exchange unit, resulting in heated ammonia and cooled engine coolant, wherein the heated ammonia exits the heat-exchange unit and is supplied to the internal combustion engine, and wherein the cooled engine coolant exits the heat-exchange unit and is supplied to the radiator.

16. The system of claim 15, wherein the heat-exchange unit is an evaporator.

17. The system of claim 15, wherein the heat-exchange unit has a structure consisting of a series of parallel plates that allows heat-exchange via a parallel flow of the mixed phase liquid and gas ammonia and the hot engine coolant.

18. The system of claim 15, further comprising an expansion valve fluidly coupled between the ammonia tank and the heat-exchange unit.

19. The system of claim 15, wherein the internal combustion engine utilizes only the heated gaseous ammonia and hydrogen generated from the liquid ammonia stored in the ammonia tank as combustion co-fuels.

20. The system of claim 15, wherein the heat-exchange unit has a structure that allows heat-exchange via a counter-current flow of the mixed phase liquid and gas ammonia and the hot engine coolant.

* * * * *